US008653149B2

(12) United States Patent
Robinson et al.

(10) Patent No.: US 8,653,149 B2
(45) Date of Patent: Feb. 18, 2014

(54) CONVERSION OF LIQUID HEAVY HYDROCARBON FEEDSTOCKS TO GASEOUS PRODUCTS

(75) Inventors: Earl T. Robinson, Lakeland, FL (US); Pattabhi K. Raman, Kildeer, IL (US); Wenyuan Wu, Naperville, IL (US)

(73) Assignee: GreatPoint Energy, Inc., Cambridge, MA (US)

( * ) Notice: Subject to any disclaimer, the term of this patent is extended or adjusted under 35 U.S.C. 154(b) by 341 days.

(21) Appl. No.: 13/116,647

(22) Filed: May 26, 2011

(65) Prior Publication Data
US 2011/0294905 A1 Dec. 1, 2011

Related U.S. Application Data

(60) Provisional application No. 61/349,462, filed on May 28, 2010.

(51) Int. Cl.
C07C 27/00 (2006.01)
(52) U.S. Cl.
USPC ........... 518/704; 518/700; 518/702; 518/703; 518/717
(58) Field of Classification Search
USPC .......................... 518/700, 702, 703, 704, 717
See application file for complete search history.

(56) References Cited

U.S. PATENT DOCUMENTS

| 2,605,215 | A | * | 7/1952 | Coghlan | 208/128 |
|---|---|---|---|---|---|
| 2,694,623 | A | | 11/1954 | Welty, Jr. et al. | |
| 2,791,549 | A | | 5/1957 | Jahnig | |
| 2,813,126 | A | | 11/1957 | Tierney | |
| 2,860,959 | A | | 11/1958 | Pettyjohn et al. | |
| 2,886,405 | A | | 5/1959 | Benson et al. | |
| 3,034,848 | A | | 5/1962 | King | |
| 3,114,930 | A | | 12/1963 | Oldham et al. | |
| 3,150,716 | A | | 9/1964 | Strelzoff et al. | |
| 3,164,330 | A | | 1/1965 | Neidl | |
| 3,351,563 | A | | 11/1967 | Negra et al. | |
| 3,435,590 | A | | 4/1969 | Smith | |
| 3,531,917 | A | | 10/1970 | Grunewald et al. | |
| 3,544,291 | A | | 12/1970 | Schlinger et al. | |
| 3,594,985 | A | | 7/1971 | Ameen et al. | |
| 3,615,300 | A | | 10/1971 | Holm et al. | |
| 3,689,240 | A | | 9/1972 | Aldridge et al. | |
| 3,740,193 | A | | 6/1973 | Aldridge et al. | |
| 3,746,522 | A | | 7/1973 | Donath | |
| 3,759,036 | A | | 9/1973 | White | |
| 3,779,725 | A | | 12/1973 | Hegarty et al. | |
| 3,814,725 | A | | 6/1974 | Zimmerman et al. | |
| 3,817,725 | A | | 6/1974 | Sieg et al. | |
| 3,828,474 | A | | 8/1974 | Quartulli | |
| 3,833,327 | A | | 9/1974 | Pitzer et al. | |
| 3,847,567 | A | | 11/1974 | Kalina et al. | |
| 3,876,393 | A | | 4/1975 | Kasai et al. | |
| 3,904,386 | A | | 9/1975 | Graboski et al. | |
| 3,915,670 | A | | 10/1975 | Lacey et al. | |
| 3,920,229 | A | | 11/1975 | Piggott | |
| 3,929,431 | A | | 12/1975 | Koh et al. | |
| 3,958,957 | A | | 5/1976 | Koh et al. | |
| 3,966,875 | A | | 6/1976 | Bratzler et al. | |
| 3,969,089 | A | | 7/1976 | Moss et al. | |
| 3,971,639 | A | | 7/1976 | Matthews | |
| 3,972,693 | A | | 8/1976 | Wiesner et al. | |
| 3,975,168 | A | | 8/1976 | Gorbaty | |
| 3,985,519 | A | | 10/1976 | Kalina et al. | |
| 3,989,811 | A | | 11/1976 | Hill | |
| 3,996,014 | A | | 12/1976 | Muller et al. | |
| 3,998,607 | A | | 12/1976 | Wesswlhoft et al. | |
| 3,999,607 | A | | 12/1976 | Pennington et al. | |
| 4,005,996 | A | | 2/1977 | Hausberger et al. | |
| 4,011,066 | A | | 3/1977 | Bratzler et al. | |
| 4,017,272 | A | | 4/1977 | Anwer et al. | |
| 4,021,370 | A | | 5/1977 | Harris et al. | |
| 4,025,423 | A | | 5/1977 | Stonner et al. | |
| 4,044,098 | A | | 8/1977 | Miller et al. | |
| 4,046,523 | A | | 9/1977 | Kalina et al. | |
| 4,052,176 | A | | 10/1977 | Child et al. | |
| 4,053,554 | A | | 10/1977 | Reed et al. | |
| 4,057,512 | A | | 11/1977 | Vadovic et al. | |
| 4,069,304 | A | | 1/1978 | Starkovish et al. | |
| 4,077,778 | A | | 3/1978 | Nahas et al. | |
| 4,091,073 | A | | 5/1978 | Winkler | |
| 4,092,125 | A | | 5/1978 | Stambaugh et al. | |
| 4,094,650 | A | | 6/1978 | Koh et al. | |
| 4,100,256 | A | | 7/1978 | Bozzelli et al. | |
| 4,101,449 | A | | 7/1978 | Noda et al. | |

(Continued)

FOREIGN PATENT DOCUMENTS

| CA | 966660 | 4/1975 |
|---|---|---|
| CA | 1003217 | 1/1977 |

(Continued)

OTHER PUBLICATIONS

A.G. Collot et al., "Co-pyrolysis and co-gasification of coal and biomass in bench-scale fixed-bed and fluidized bed reactors", (1999) Fuel 78, pp. 667-679.
Wenkui Zhu et al., "Catalytic gasification of char from co-pyrolysis of coal and biomass", (2008) Fuel Processing Technology, vol. 89, pp. 890-896.
Chiesa P. et al., "Co-Production of hydrogen, electricity and C02 from coal with commercially ready technology. Part A: Performance and emissions", (2005) International Journal of Hydrogen Energy, vol. 30, No. 7, pp. 747-767.
Brown et al., "Biomass-Derived Hydrogen From a Thermally Ballasted Gasifier", DOE Hydrogen Program Contractors' Review meeting, May 18-21, 2003, Center for Sustainable Environmental Technologies Iowa State University.

(Continued)

Primary Examiner — Jafar Parsa
(74) Attorney, Agent, or Firm — McDonnell Boehnen Hulbert & Berghoff LLP

(57) ABSTRACT

The present invention relates to processes and apparatuses for generating light olefins, methane and other higher-value gaseous hydrocarbons from "liquid" heavy hydrocarbon feedstocks.

20 Claims, 2 Drawing Sheets

(56) References Cited

U.S. PATENT DOCUMENTS

| | | |
|---|---|---|
| 4,104,201 A | 8/1978 | Banks et al. |
| 4,113,615 A | 9/1978 | Gorbaty |
| 4,116,996 A | 9/1978 | Huang |
| 4,118,204 A | 10/1978 | Eakman et al. |
| 4,152,119 A | 5/1979 | Schulz |
| 4,157,246 A | 6/1979 | Eakman et al. |
| 4,159,195 A | 6/1979 | Clavenna |
| 4,162,902 A | 7/1979 | Wiesner et al. |
| 4,173,465 A | 11/1979 | Meissner et al. |
| 4,189,307 A | 2/1980 | Marion |
| 4,193,771 A | 3/1980 | Sharp et al. |
| 4,193,772 A | 3/1980 | Sharp |
| 4,200,439 A | 4/1980 | Lang |
| 4,204,843 A | 5/1980 | Neavel |
| 4,211,538 A | 7/1980 | Eakman et al. |
| 4,211,669 A | 7/1980 | Eakman et al. |
| 4,219,338 A | 8/1980 | Wolfs et al. |
| 4,223,728 A | 9/1980 | Pegg |
| 4,225,457 A | 9/1980 | Schulz |
| 4,235,044 A | 11/1980 | Cheung |
| 4,243,639 A | 1/1981 | Haas et al. |
| 4,249,471 A | 2/1981 | Gunnerman |
| 4,252,771 A | 2/1981 | Lagana et al. |
| 4,260,421 A | 4/1981 | Brown et al. |
| 4,265,868 A | 5/1981 | Kamody |
| 4,270,937 A | 6/1981 | Adler et al. |
| 4,284,416 A | 8/1981 | Nahas |
| 4,292,048 A | 9/1981 | Wesselhoft et al. |
| 4,298,584 A | 11/1981 | Makrides |
| 4,315,753 A | 2/1982 | Bruckenstein et al. |
| 4,315,758 A | 2/1982 | Patel et al. |
| 4,318,712 A | 3/1982 | Lang et al. |
| 4,322,222 A | 3/1982 | Sass |
| 4,330,305 A | 5/1982 | Kuessner et al. |
| 4,331,451 A | 5/1982 | Isogaya et al. |
| 4,334,893 A | 6/1982 | Lang |
| 4,336,034 A | 6/1982 | Lang et al. |
| 4,336,233 A | 6/1982 | Appl et al. |
| 4,341,531 A | 7/1982 | Duranleau et al. |
| 4,344,486 A | 8/1982 | Parrish |
| 4,347,063 A | 8/1982 | Sherwood et al. |
| 4,348,486 A | 9/1982 | Calvin et al. |
| 4,348,487 A | 9/1982 | Goldstein et al. |
| 4,353,713 A | 10/1982 | Cheng |
| 4,365,975 A | 12/1982 | Williams et al. |
| 4,372,755 A | 2/1983 | Tolman et al. |
| 4,375,362 A | 3/1983 | Moss |
| 4,385,905 A | 5/1983 | Tucker |
| 4,397,656 A | 8/1983 | Ketkar |
| 4,400,182 A | 8/1983 | Davies et al. |
| 4,407,206 A | 10/1983 | Bartok et al. |
| 4,428,535 A | 1/1984 | Venetucci |
| 4,432,773 A | 2/1984 | Euker, Jr. et al. |
| 4,433,065 A | 2/1984 | Van Der Burgt et al. |
| 4,436,028 A | 3/1984 | Wilder |
| 4,436,531 A | 3/1984 | Estabrook et al. |
| 4,439,210 A | 3/1984 | Lancet |
| 4,443,415 A | 4/1984 | Queneau et al. |
| 4,444,568 A | 4/1984 | Beisswenger et al. |
| 4,459,138 A | 7/1984 | Soung |
| 4,462,814 A | 7/1984 | Holmes et al. |
| 4,466,828 A | 8/1984 | Tamai et al. |
| 4,468,231 A | 8/1984 | Bartok et al. |
| 4,478,425 A | 10/1984 | Benko |
| 4,478,725 A | 10/1984 | Velling et al. |
| 4,482,529 A | 11/1984 | Chen et al. |
| 4,491,609 A | 1/1985 | Degel et al. |
| 4,497,784 A | 2/1985 | Diaz |
| 4,500,323 A | 2/1985 | Siegfried et al. |
| 4,505,881 A | 3/1985 | Diaz |
| 4,508,544 A | 4/1985 | Moss |
| 4,508,693 A | 4/1985 | Diaz |
| 4,515,604 A | 5/1985 | Eisenlohr et al. |
| 4,515,764 A | 5/1985 | Diaz |
| 4,524,050 A | 6/1985 | Chen et al. |
| 4,540,681 A | 9/1985 | Kustes et al. |
| 4,541,841 A | 9/1985 | Reinhardt |
| 4,551,155 A | 11/1985 | Wood et al. |
| 4,558,027 A | 12/1985 | McKee et al. |
| 4,572,826 A | 2/1986 | Moore |
| 4,594,140 A | 6/1986 | Cheng |
| 4,597,775 A | 7/1986 | Billimoria et al. |
| 4,597,776 A | 7/1986 | Ullman et al. |
| 4,604,105 A | 8/1986 | Aquino et al. |
| 4,609,388 A | 9/1986 | Adler et al. |
| 4,609,456 A | 9/1986 | Deschamps et al. |
| 4,617,027 A | 10/1986 | Lang |
| 4,619,864 A | 10/1986 | Hendrix et al. |
| 4,620,421 A | 11/1986 | Brown et al. |
| 4,661,237 A | 4/1987 | Kimura et al. |
| 4,668,428 A | 5/1987 | Najjar |
| 4,668,429 A | 5/1987 | Najjar |
| 4,675,035 A | 6/1987 | Apffel |
| 4,678,480 A | 7/1987 | Heinrich et al. |
| 4,682,986 A | 7/1987 | Lee et al. |
| 4,690,814 A | 9/1987 | Velenyi et al. |
| 4,696,678 A | 9/1987 | Koyama et al. |
| 4,699,632 A | 10/1987 | Babu et al. |
| 4,704,136 A | 11/1987 | Weston et al. |
| 4,720,289 A | 1/1988 | Vaugh et al. |
| 4,747,938 A | 5/1988 | Khan |
| 4,781,731 A | 11/1988 | Schlinger |
| 4,803,061 A | 2/1989 | Najjar et al. |
| 4,808,194 A | 2/1989 | Najjar et al. |
| 4,810,475 A | 3/1989 | Chu et al. |
| 4,822,935 A | 4/1989 | Scott |
| 4,848,983 A | 7/1989 | Tomita et al. |
| 4,854,944 A | 8/1989 | Strong |
| 4,861,346 A | 8/1989 | Najjar et al. |
| 4,861,360 A | 8/1989 | Apffel |
| 4,872,886 A | 10/1989 | Henley et al. |
| 4,876,080 A | 10/1989 | Paulson |
| 4,892,567 A | 1/1990 | Yan |
| 4,960,450 A | 10/1990 | Schwarz et al. |
| 4,995,193 A | 2/1991 | Soga et al. |
| 5,017,282 A | 5/1991 | Delbianco et al. |
| 5,055,181 A | 10/1991 | Maa et al. |
| 5,057,294 A | 10/1991 | Sheth et al. |
| 5,059,406 A | 10/1991 | Sheth et al. |
| 5,074,357 A | 12/1991 | Haines |
| 5,093,094 A | 3/1992 | Van Kleeck et al. |
| 5,094,737 A | 3/1992 | Bearden, Jr. et al. |
| 5,132,007 A | 7/1992 | Meyer et al. |
| 5,223,173 A | 6/1993 | Jeffrey |
| 5,225,044 A | 7/1993 | Breu |
| 5,236,557 A | 8/1993 | Muller et al. |
| 5,250,083 A | 10/1993 | Wolfenbarger et al. |
| 5,277,884 A | 1/1994 | Shinnar et al. |
| 5,388,645 A | 2/1995 | Puri et al. |
| 5,388,650 A | 2/1995 | Michael |
| 5,435,940 A | 7/1995 | Doering et al. |
| 5,536,893 A | 7/1996 | Gudmundsson |
| 5,566,755 A | 10/1996 | Seidle et al. |
| 5,616,154 A | 4/1997 | Elliott et al. |
| 5,630,854 A | 5/1997 | Sealock, Jr. et al. |
| 5,641,327 A | 6/1997 | Leas |
| 5,660,807 A | 8/1997 | Forg et al. |
| 5,669,960 A | 9/1997 | Couche |
| 5,670,122 A | 9/1997 | Zamansky et al. |
| 5,720,785 A | 2/1998 | Baker |
| 5,733,515 A | 3/1998 | Doughty et al. |
| 5,769,165 A | 6/1998 | Bross et al. |
| 5,776,212 A | 7/1998 | Leas |
| 5,788,724 A | 8/1998 | Carugati et al. |
| 5,855,631 A | 1/1999 | Leas |
| 5,865,898 A | 2/1999 | Holtzapple et al. |
| 5,968,465 A | 10/1999 | Koveal et al. |
| 6,013,158 A | 1/2000 | Wootten |
| 6,015,104 A | 1/2000 | Rich, Jr. |
| 6,028,234 A | 2/2000 | Heinemann et al. |
| 6,032,737 A | 3/2000 | Brady et al. |
| 6,090,356 A | 7/2000 | Jahnke et al. |
| 6,119,778 A | 9/2000 | Seidle et al. |
| 6,132,478 A | 10/2000 | Tsurui et al. |

(56) References Cited

U.S. PATENT DOCUMENTS

| | | |
|---|---|---|
| 6,180,843 B1 | 1/2001 | Heinemann et al. |
| 6,187,465 B1 | 2/2001 | Galloway |
| 6,379,645 B1 | 4/2002 | Bucci et al. |
| 6,389,820 B1 | 5/2002 | Rogers et al. |
| 6,419,888 B1 | 7/2002 | Wyckoff |
| 6,506,349 B1 | 1/2003 | Khanmamedov |
| 6,506,361 B1 | 1/2003 | Machado et al. |
| 6,602,326 B2 | 8/2003 | Lee et al. |
| 6,641,625 B1 | 11/2003 | Clawson et al. |
| 6,653,516 B1 | 11/2003 | Yoshikawa et al. |
| 6,692,711 B1 | 2/2004 | Alexion et al. |
| 6,790,430 B1 | 9/2004 | Lackner et al. |
| 6,797,253 B2 | 9/2004 | Lyon |
| 6,808,543 B2 | 10/2004 | Paisley |
| 6,830,597 B1 | 12/2004 | Green |
| 6,855,852 B1 | 2/2005 | Jackson et al. |
| 6,878,358 B2 | 4/2005 | Vosteen et al. |
| 6,894,183 B2 | 5/2005 | Choudhary et al. |
| 6,955,595 B2 | 10/2005 | Kim |
| 6,955,695 B2 | 10/2005 | Nahas |
| 6,969,494 B2 | 11/2005 | Herbst |
| 7,074,373 B1 | 7/2006 | Warren et al. |
| 7,077,202 B2 | 7/2006 | Shaw et al. |
| 7,100,692 B2 | 9/2006 | Parsley et al. |
| 7,118,720 B1 | 10/2006 | Mendelsohn et al. |
| 7,132,183 B2 | 11/2006 | Galloway |
| 7,168,488 B2 | 1/2007 | Olsvik et al. |
| 7,205,448 B2 | 4/2007 | Gajda et al. |
| 7,220,502 B2 | 5/2007 | Galloway |
| 7,299,868 B2 | 11/2007 | Zapadinski |
| 7,309,383 B2 | 12/2007 | Beech, Jr. et al. |
| 7,481,275 B2 | 1/2009 | Olsvik et al. |
| 7,666,383 B2 | 2/2010 | Green |
| 7,677,309 B2 | 3/2010 | Shaw et al. |
| 7,758,663 B2 | 7/2010 | Rabovitser et al. |
| 7,897,126 B2 | 3/2011 | Rappas et al. |
| 7,901,644 B2 | 3/2011 | Rappas et al. |
| 7,922,782 B2 | 4/2011 | Sheth |
| 7,926,750 B2 | 4/2011 | Hauserman |
| 7,976,593 B2 | 7/2011 | Graham |
| 8,114,176 B2 | 2/2012 | Nahas |
| 8,114,177 B2 | 2/2012 | Hippo et al. |
| 8,123,827 B2 | 2/2012 | Robinson |
| 8,163,048 B2 | 4/2012 | Rappas et al. |
| 8,192,716 B2 | 6/2012 | Raman et al. |
| 8,202,913 B2 | 6/2012 | Robinson et al. |
| 8,268,899 B2 | 9/2012 | Robinson et al. |
| 8,286,901 B2 | 10/2012 | Rappas et al. |
| 8,297,542 B2 | 10/2012 | Rappas et al. |
| 8,328,890 B2 | 12/2012 | Reiling et al. |
| 8,349,037 B2 | 1/2013 | Steiner et al. |
| 8,349,039 B2 | 1/2013 | Robinson |
| 8,361,428 B2 | 1/2013 | Raman et al. |
| 8,366,795 B2 | 2/2013 | Raman et al. |
| 8,479,833 B2 | 7/2013 | Raman |
| 8,479,834 B2 | 7/2013 | Preston |
| 8,502,007 B2 | 8/2013 | Hippo et al. |
| 2002/0036086 A1 | 3/2002 | Minkkinen et al. |
| 2003/0070808 A1 | 4/2003 | Allison |
| 2003/0131582 A1 | 7/2003 | Anderson et al. |
| 2003/0167691 A1 | 9/2003 | Nahas |
| 2004/0020123 A1 | 2/2004 | Kimura et al. |
| 2004/0023086 A1 | 2/2004 | Su et al. |
| 2004/0123601 A1 | 7/2004 | Fan |
| 2004/0180971 A1 | 9/2004 | Inoue et al. |
| 2004/0256116 A1 | 12/2004 | Olsvik et al. |
| 2005/0107648 A1 | 5/2005 | Kimura et al. |
| 2005/0137442 A1 | 6/2005 | Gajda et al. |
| 2005/0192362 A1 | 9/2005 | Rodriguez et al. |
| 2005/0287056 A1 | 12/2005 | Baker et al. |
| 2005/0288537 A1 | 12/2005 | Maund et al. |
| 2006/0149423 A1 | 7/2006 | Barnicki et al. |
| 2006/0228290 A1 | 10/2006 | Green |
| 2006/0231252 A1 | 10/2006 | Shaw et al. |
| 2006/0265953 A1 | 11/2006 | Hobbs |
| 2006/0272813 A1 | 12/2006 | Olsvik et al. |
| 2007/0000177 A1 | 1/2007 | Hippo et al. |
| 2007/0051043 A1 | 3/2007 | Schingnitz |
| 2007/0083072 A1 | 4/2007 | Nahas |
| 2007/0180990 A1 | 8/2007 | Downs et al. |
| 2007/0186472 A1 | 8/2007 | Rabovister et al. |
| 2007/0220810 A1 | 9/2007 | Leveson et al. |
| 2007/0227729 A1 | 10/2007 | Zubrin et al. |
| 2007/0237696 A1 | 10/2007 | Payton |
| 2007/0277437 A1 | 12/2007 | Sheth |
| 2007/0282018 A1 | 12/2007 | Jenkins |
| 2008/0141591 A1 | 6/2008 | Kohl |
| 2008/0289822 A1 | 11/2008 | Betzer Tsilevich |
| 2009/0012188 A1 | 1/2009 | Rojey et al. |
| 2009/0048476 A1 | 2/2009 | Rappas et al. |
| 2009/0090055 A1 | 4/2009 | Ohtsuka |
| 2009/0090056 A1 | 4/2009 | Ohtsuka |
| 2009/0165361 A1 | 7/2009 | Rappas et al. |
| 2009/0165376 A1 | 7/2009 | Lau et al. |
| 2009/0165379 A1 | 7/2009 | Rappas |
| 2009/0165380 A1 | 7/2009 | Lau et al. |
| 2009/0165381 A1 | 7/2009 | Robinson |
| 2009/0165382 A1 | 7/2009 | Rappas et al. |
| 2009/0165383 A1 | 7/2009 | Rappas et al. |
| 2009/0165384 A1 | 7/2009 | Lau et al. |
| 2009/0166588 A1 | 7/2009 | Spitz et al. |
| 2009/0169448 A1 | 7/2009 | Rappas et al. |
| 2009/0169449 A1 | 7/2009 | Rappas et al. |
| 2009/0170968 A1 | 7/2009 | Nahas et al. |
| 2009/0173079 A1 | 7/2009 | Wallace et al. |
| 2009/0217575 A1 | 9/2009 | Raman et al. |
| 2009/0217582 A1 | 9/2009 | May et al. |
| 2009/0217584 A1 | 9/2009 | Raman et al. |
| 2009/0217585 A1 | 9/2009 | Raman et al. |
| 2009/0217586 A1 | 9/2009 | Rappas et al. |
| 2009/0217587 A1 | 9/2009 | Raman et al. |
| 2009/0217588 A1 | 9/2009 | Hippo et al. |
| 2009/0217589 A1 | 9/2009 | Robinson |
| 2009/0217590 A1 | 9/2009 | Rappas et al. |
| 2009/0218424 A1 | 9/2009 | Hauserman |
| 2009/0220406 A1 | 9/2009 | Rahman |
| 2009/0229182 A1 | 9/2009 | Raman et al. |
| 2009/0235585 A1 | 9/2009 | Neels et al. |
| 2009/0236093 A1 | 9/2009 | Zubrin et al. |
| 2009/0246120 A1 | 10/2009 | Raman et al. |
| 2009/0259080 A1 | 10/2009 | Raman et al. |
| 2009/0260287 A1 | 10/2009 | Lau |
| 2009/0305093 A1 | 12/2009 | Biollaz et al. |
| 2009/0324458 A1 | 12/2009 | Robinson et al. |
| 2009/0324459 A1 | 12/2009 | Robinson et al. |
| 2009/0324460 A1 | 12/2009 | Robinson et al. |
| 2009/0324461 A1 | 12/2009 | Robinson et al. |
| 2009/0324462 A1 | 12/2009 | Robinson et al. |
| 2010/0018113 A1 | 1/2010 | Bohlig et al. |
| 2010/0050654 A1 | 3/2010 | Chiu et al. |
| 2010/0071235 A1 | 3/2010 | Pan et al. |
| 2010/0071262 A1 | 3/2010 | Robinson et al. |
| 2010/0076235 A1 | 3/2010 | Reiling et al. |
| 2010/0120926 A1 | 5/2010 | Robinson et al. |
| 2010/0121125 A1 | 5/2010 | Hippo et al. |
| 2010/0159352 A1 | 6/2010 | Gelin et al. |
| 2010/0168494 A1 | 7/2010 | Rappas et al. |
| 2010/0168495 A1 | 7/2010 | Rappas et al. |
| 2010/0179232 A1 | 7/2010 | Robinson et al. |
| 2010/0287835 A1 | 11/2010 | Reiling et al. |
| 2010/0287836 A1 | 11/2010 | Robinson et al. |
| 2010/0292350 A1 | 11/2010 | Robinson et al. |
| 2011/0031439 A1 | 2/2011 | Sirdeshpande et al. |
| 2011/0062012 A1 | 3/2011 | Robinson |
| 2011/0062721 A1 | 3/2011 | Sirdeshpande et al. |
| 2011/0062722 A1 | 3/2011 | Sirdeshpande et al. |
| 2011/0064648 A1 | 3/2011 | Preston et al. |
| 2011/0088896 A1 | 4/2011 | Preston |
| 2011/0088897 A1 | 4/2011 | Raman |
| 2011/0146978 A1 | 6/2011 | Perlman |
| 2011/0146979 A1 | 6/2011 | Wallace |
| 2011/0207002 A1 | 8/2011 | Powell et al. |
| 2011/0217602 A1 | 9/2011 | Sirdeshpande |
| 2011/0262323 A1 | 10/2011 | Rappas et al. |

(56) References Cited

U.S. PATENT DOCUMENTS

| | | |
|---|---|---|
| 2011/0294905 A1 | 12/2011 | Robinson et al. |
| 2012/0046510 A1 | 2/2012 | Sirdeshpande |
| 2012/0060417 A1 | 3/2012 | Raman et al. |
| 2012/0102836 A1 | 5/2012 | Raman et al. |
| 2012/0102837 A1 | 5/2012 | Raman et al. |
| 2013/0042824 A1 | 2/2013 | Sirdeshpande |
| 2013/0046124 A1 | 2/2013 | Sirdeshpande |
| 2013/0172640 A1 | 7/2013 | Robinson et al. |

FOREIGN PATENT DOCUMENTS

| | | |
|---|---|---|
| CA | 1041553 | 10/1978 |
| CA | 1106178 | 8/1981 |
| CA | 1 125 026 | 6/1982 |
| CA | 1187702 | 6/1985 |
| CA | 1282243 | 4/1991 |
| CA | 1299589 | 4/1992 |
| CA | 1332108 | 9/1994 |
| CA | 2673121 | 6/2008 |
| CA | 2713642 | 7/2009 |
| CN | 1477090 | 2/2004 |
| CN | 101555420 | 10/2009 |
| DE | 2 210 891 | 3/1972 |
| DE | 2210891 | 9/1972 |
| DE | 2852710 | 6/1980 |
| DE | 3422202 | 12/1985 |
| DE | 100610607 | 6/2002 |
| EA | 819 | 4/2000 |
| EP | 0024792 | 3/1981 |
| EP | 0 067 580 | 12/1982 |
| EP | 102828 | 3/1984 |
| EP | 0 138 463 | 4/1985 |
| EP | 0 225 146 | 6/1987 |
| EP | 0 259 927 | 3/1988 |
| EP | 0473153 | 3/1992 |
| EP | 0 723 930 | 7/1996 |
| EP | 1 001 002 | 5/2000 |
| EP | 1004746 | 5/2000 |
| EP | 1136542 | 9/2001 |
| EP | 1 207 132 | 5/2002 |
| EP | 1 741 673 | 6/2006 |
| EP | 1768207 | 3/2007 |
| EP | 2058471 | 5/2009 |
| FR | 797 089 | 4/1936 |
| FR | 2 478 615 | 9/1981 |
| FR | 2906879 | 4/2008 |
| GB | 593910 | 10/1947 |
| GB | 640907 | 8/1950 |
| GB | 676615 | 7/1952 |
| GB | 701 131 | 12/1953 |
| GB | 760627 | 11/1956 |
| GB | 798741 | 7/1958 |
| GB | 820 257 | 9/1959 |
| GB | 996327 | 6/1965 |
| GB | 1033764 | 6/1966 |
| GB | 1448562 | 9/1976 |
| GB | 1453081 | 10/1976 |
| GB | 1467219 | 3/1977 |
| GB | 1467995 | 3/1977 |
| GB | 1 599 932 | 7/1977 |
| GB | 1560873 | 2/1980 |
| GB | 2078251 | 1/1982 |
| GB | 2154600 | 9/1985 |
| GB | 2455864 | 6/2009 |
| JP | 53-94305 | 8/1978 |
| JP | 53-111302 | 9/1978 |
| JP | 54020003 | 2/1979 |
| JP | 54-150402 | 11/1979 |
| JP | 55-12181 | 1/1980 |
| JP | 56-145982 | 11/1981 |
| JP | 56157493 | 12/1981 |
| JP | 60-35092 | 2/1985 |
| JP | 60-77938 | 5/1985 |
| JP | 62241991 | 10/1987 |
| JP | 62 257985 | 11/1987 |
| JP | 03-115491 | 5/1991 |
| JP | 2000290659 | 10/2000 |
| JP | 2000290670 | 10/2000 |
| JP | 2002105467 | 4/2002 |
| JP | 2004292200 | 10/2004 |
| JP | 2004298818 | 10/2004 |
| JP | 2006 169476 A | 6/2006 |
| WO | 00/18681 | 4/2000 |
| WO | WO 00/43468 | 7/2000 |
| WO | WO 02/40768 | 5/2002 |
| WO | WO 02/079355 | 10/2002 |
| WO | 02/103157 | 12/2002 |
| WO | 03/018958 | 3/2003 |
| WO | WO 03/033624 | 4/2003 |
| WO | 2004/055323 | 7/2004 |
| WO | WO 2004/072210 | 8/2004 |
| WO | WO 2006/031011 | 3/2006 |
| WO | WO 2007/005284 | 1/2007 |
| WO | WO 2007/047210 | 4/2007 |
| WO | 2007/068682 | 6/2007 |
| WO | 2007/077137 | 7/2007 |
| WO | 2007/077138 | 7/2007 |
| WO | 2007/083072 | 7/2007 |
| WO | WO 2007/076363 | 7/2007 |
| WO | WO 2007/128370 | 11/2007 |
| WO | 2007/143376 | 12/2007 |
| WO | WO 2007/143376 | 12/2007 |
| WO | 2008/058636 | 5/2008 |
| WO | WO 2008/073889 | 6/2008 |
| WO | 2008/087154 | 7/2008 |
| WO | 2009/018053 | 2/2009 |
| WO | WO 2009/018053 | 2/2009 |
| WO | WO 2009/048723 | 4/2009 |
| WO | WO 2009/048724 | 4/2009 |
| WO | WO 2009/086361 | 7/2009 |
| WO | WO 2009/086362 | 7/2009 |
| WO | WO 2009/086363 | 7/2009 |
| WO | WO 2009/086366 | 7/2009 |
| WO | WO 2009/086367 | 7/2009 |
| WO | WO 2009/086370 | 7/2009 |
| WO | WO 2009/086372 | 7/2009 |
| WO | WO 2009/086374 | 7/2009 |
| WO | WO 2009/086377 | 7/2009 |
| WO | WO 2009/086383 | 7/2009 |
| WO | WO 2009/086407 | 7/2009 |
| WO | WO 2009/086408 | 7/2009 |
| WO | WO 2009/111330 | 9/2009 |
| WO | WO 2009/111331 | 9/2009 |
| WO | WO 2009/111332 | 9/2009 |
| WO | WO 2009/111335 | 9/2009 |
| WO | WO 2009/111342 | 9/2009 |
| WO | WO 2009/111345 | 9/2009 |
| WO | WO 2009/124017 | 10/2009 |
| WO | WO 2009/124019 | 10/2009 |
| WO | WO 2009/158576 | 12/2009 |
| WO | WO 2009/158579 | 12/2009 |
| WO | WO 2009/158580 | 12/2009 |
| WO | WO 2009/158582 | 12/2009 |
| WO | WO 2009/158583 | 12/2009 |
| WO | WO 2010/033846 | 3/2010 |
| WO | WO 2010/033848 | 3/2010 |
| WO | WO 2010/033850 | 3/2010 |
| WO | WO 2010/033852 | 3/2010 |
| WO | WO 2010/048493 | 4/2010 |
| WO | WO 2010/078297 | 7/2010 |
| WO | WO 2010/078298 | 7/2010 |
| WO | 2010/132549 | 11/2010 |
| WO | WO 2010/132551 | 11/2010 |
| WO | 2011/017630 | 2/2011 |
| WO | 2011/029278 | 3/2011 |
| WO | 2011/029282 | 3/2011 |
| WO | 2011/029283 | 3/2011 |
| WO | 2011/029284 | 3/2011 |
| WO | 2011/029285 | 3/2011 |
| WO | 2011/034888 | 3/2011 |
| WO | 2011/034889 | 3/2011 |
| WO | 2011/034891 | 3/2011 |
| WO | WO 2011/034890 | 3/2011 |

(56) References Cited

FOREIGN PATENT DOCUMENTS

| WO | 2011/049858 | 4/2011 |
|---|---|---|
| WO | 2011/049861 | 4/2011 |
| WO | 2011/063608 | 6/2011 |
| WO | 2011/084580 | 7/2011 |
| WO | 2011/084581 | 7/2011 |
| WO | 2011/106285 | 9/2011 |
| WO | 2011/139694 | 11/2011 |
| WO | 2011/150217 | 12/2011 |
| WO | WO 2012/024369 | 2/2012 |
| WO | 2012/033997 | 3/2012 |
| WO | 2012/061235 | 5/2012 |
| WO | 2012/061238 | 5/2012 |
| WO | 2012/116003 | 8/2012 |
| WO | 2012/145497 | 10/2012 |
| WO | 2012/166879 | 12/2012 |
| WO | 2013/025808 | 2/2013 |
| WO | 2013/025812 | 2/2013 |
| WO | 2013/052553 | 4/2013 |

OTHER PUBLICATIONS

Brown et al., "Biomass-Derived Hydrogen From A thermally Ballasted Gasifier", Final Technical Report, Iowa State University, Aug. 2005.

Chiaramonte et al, "Upgrade Coke by Gasification", (1982) Hydrocarbon Processing, vol. 61 (9), pp. 255-257 (Abstract only).

Gerdes, Kristin, et al., "Integrated Gasification Fuel Cell Performance and Cost Assessment," National Energy Technology Laboratory, U.S. Department of Energy, Mar. 27, 2009, pp. 1-26.

Ghosh, S., et al., "Energy Analysis of a Cogeneration Plant Using Coal Gasification and Solid Oxide Fuel Cell," Energy, 2006, vol. 31, No. 2-3, pp. 345-363.

Jeon, S.K., et al., "Characteristics of Steam Hydrogasification of Wood Using A Micro-Batch Reactor," Fuel, 2007, vol. 86, pp. 2817-2823.

Li, Mu, et al., "Design of Highly Efficient Coal-Based Integrated Gasification Fuel Cell Power Plants," Journal of Power Sources, 2010, vol. 195, pp. 5707-5718.

Prins, M.J., et al., "Exergetic Optimisation of a Production Process of Fischer-Tropsch Fuels from Biomass," Fuel Processing Technology, 2005, vol. 86, No. 4, pp. 375-389.

U.S. Appl. No. 13/484,918, filed May 31, 2012.
U.S. Appl. No. 13/402,022, filed Feb. 22, 2012.
U.S. Appl. No. 13/450,995, filed Apr. 19, 2012.

Asami, K., et al., "Highly Active Iron Catalysts from Ferric Chloride or the Steam Gasification of Brown Coal," ind. Eng. Chem. Res., vol. 32, No. 8, 1993, pp. 1631-1636.

Berger, R., et al., "High Temperature $CO_2$-Absorption: A Process Offering New Prospects in Fuel Chemistry," The Fifth International Symposium on Coal Combustion, Nov. 2003, Nanjing, China, pp. 547-549.

Brown et al., "Biomass-Derived Hydrogen From A Thermally Ballasted Gasifier," Aug. 2005.

Brown et al., "Biomass-Derived Hydrogen From A Thermally Ballasted Gasifier," DOE Hydrogen Program Contractors' Review Metting, Center for Sustainable Environmental Technologies, Iowa State University, May 21, 2003.

Cohen, S.J., Project Manager, "Large Pilot Plant Alternatives for Scaleup of the Catalytic Coal Gasification Process," FE-2480-20, U.S. Dept. of Energy, Contract No. EX-76-C-01-2480, 1979.

Euker, Jr., C.A., Reitz, R.A., Program Managers, "Exxon Catalytic Coal-Gasification-Process Development Program," Exxon Research & Engineering Company, FE-2777-31, U.S. Dept. of Energy, Contract No. ET-78-C-01-2777, 1981.

Kalina, T., Nahas, N.C., Project Managers, "Exxon Catalaytic Coal Gasification Process Predevelopment Program," Exxon Research & Engineering Company, FE-2369-24, U.S. Dept. of Energy, Contract No. E(49-18)-2369, 1978.

Nahas, N.C., "Exxon Catalytic Coal Gasification Process—Fundamentals to Flowsheets," Fuel, vol. 62, No. 2, 1983, pp. 239-241.

Ohtsuka, Y. et al., "Highly Active Catalysts from Inexpensive Raw Materials for Coal Gasification," Catalysis Today, vol. 39, 1997, pp. 111-125.

Ohtsuka, Yasuo et al, "Steam Gasification of Low-Rank Coals with a Chlorine-Free Iron Catalyst from Ferric Chloride," Ind. Eng. Chem. Res., vol. 30, No. 8, 1991, pp. 1921-1926.

Ohtsuka, Yasuo et al., "Calcium Catalysed Steam Gasification of Yalourn Brown Coal," Fuel, vol. 65, 1986, pp. 1653-1657.

Ohtsuka, Yasuo, et al, "Iron-Catalyzed Gasification of Brown Coal at Low Temperatures," Energy & Fuels, vol. 1, No. 1, 1987, pp. 32-36.

Ohtsuka, Yasuo, et al., "Ion-Exchanged Calcium From Calcium Carbonate and Low-Rank Coals: High Catalytic Activity in Steam Gasification," Energy & Fuels 1996, 10, pp. 431-435.

Ohtsuka, Yasuo et al., "Steam Gasification of Coals with Calcium Hydroxide," Energy & Fuels, vol. 9, No. 6, 1995, pp. 1038-1042.

Pereira, P., et al., "Catalytic Steam Gasification of Coals," Energy & Fuels, vol. 6, No. 4, 1992, pp. 407-410.

Ruan Xiang-Quan, et al., "Effects of Catalysis on Gasification of Tatong Coal Char," Fuel, vol. 66, Apr. 1987, pp. 568-571.

Tandon, D., "Low Temperature and Elevated Pressure Steam Gasification of Illinois Coal," College of Engineering in the Graduate School, Southern Illinois university at Carbondale, Jun. 1996.

U.S. Appl. No. 12/778,538, filed May 12, 2010, Robinson, et al.
U.S. Appl. No. 12/778,548, filed May 12, 2010, Robinson, et al.
U.S. Appl. No. 12/778,552, filed May 12, 2010, Robinson, et al.

Coal Data: A Reference, Energy Information Administration, Office of Coal, Nuclear, Electric, and Alternate Fuels U.S. Department of Energy, DOE/EIA-0064(93), Feb. 1995.

Deepak Tandon, Dissertation Approval, "Low Temperature and Elevated Pressure Steam Gasification of Illinois Coal", Jun. 13, 1996.

Demibras, "Demineralization of Agricultural Residues by Water Leaching", Energy Sources, vol. 25, pp. 679-687, (2003).

Gallagher Jr., et al., "Catalytic Coal Gasification for SNG Manufacture", Energy Research, vol. 4, pp. 137-147, (1980).

Heinemann, et al., "Fundamental and Exploratory Studies of Catalytic Steam Gasification of Carbonaceous Materials", Final Report Fiscal Years 1985-1994.

Jensen, et al. Removal of K and Cl by leaching of straw char, Biomass and Bioenergy, vol. 20, pp. 447-457, (2001).

Meyers, et al. Fly Ash as A Construction Material for Highways, A Manual. Federal Highway Administration, Report No. FHWA-IP-76-16, Washington, DC, 1976.

Natural Gas Processing: The Crucial Link Between Natural Gas Production and Its Transportation to Market. Energy Information Administration, Office of Oil and Gas; pp. 1-11, (2006).

Prins, et al., "Exergetic optimisation of a production process of Fischer-Tropsch fuels from biomass", Fuel Processing Technology, vol. 86, pp. 375-389, (2004).

Moulton, Lyle K. "Bottom Ash and Boiler Slag", Proceedings of the Third International Ash Utilization Symposium, U.S. Bureau of Mines, Information Circular No. 8640, Washington, DC, 1973.

Hydromethanation Process, GreatPoint Energy, Inc., from World Wide Web <http://greatpointenergy.com/ourtechnology.php.> accessed Sep. 5, 2013.

Sigma-Aldrich "Particle Size Conversion Table" (2004); from World Wide Web <http:/www.sigmaaldrich.com/chemistry/learning-center/technical-library/particle-size-conversion.printerview.html>.

\* cited by examiner

CONVERSION OF LIQUID HEAVY HYDROCARBON FEEDSTOCKS TO GASEOUS PRODUCTS

CROSS-REFERENCE TO RELATED APPLICATION

This application claims priority under 35 U.S.C. §119 from U.S. Provisional Application Ser. No. 61/349,462 (filed 28 May 2010), the disclosure of which is incorporated by reference herein for all purposes as if fully set forth.

FIELD OF THE INVENTION

The present invention relates to processes and apparatuses for generating light olefins, methane and other higher-value gaseous hydrocarbons from "liquid" heavy hydrocarbon feedstocks.

BACKGROUND OF THE INVENTION

Liquid heavy hydrocarbon feedstocks are viscous liquid or semi-solid materials that are flowable at ambient conditions or can be made flowable at elevated temperature conditions. These materials are typically the residue from the processing of hydrocarbon materials such as crude oil.

For example, the first step in the refining of crude oil is normally a distillation to separate the complex mixture of hydrocarbons into fractions of differing volatility. A typical first-step distillation requires heating at atmospheric pressure to vaporize as much of the hydrocarbon content as possible without exceeding an actual temperature of about 650° F., since higher temperatures may lead to thermal decomposition. The fraction which is not distilled at atmospheric pressure is commonly referred to as "atmospheric petroleum residue". The fraction may be further distilled under vacuum, such that an actual temperature of up to about 650° F. can vaporize even more material. The remaining undistillable liquid is referred to as "vacuum petroleum residue". Both atmospheric petroleum residue and vacuum petroleum residue are considered liquid heavy hydrocarbon materials for the purposes of the present invention.

Liquid heavy hydrocarbon materials are in a relative sense low value materials, for example, as a fuel because of their high viscosity and low volatility, and increased concentration of impurities such as sulfur. For example, sulfur concentration in vacuum petroleum residue is typically at least about 2.5 times the concentration of sulfur in crude oil.

In the case of petroleum residues, the residue fraction typically constitutes more than 20% by mass of the starting crude oil, and in some cases more than 50% of the mass of the starting crude oil in the case of heavy crude oils, so there is high incentive to convert the residue to higher-value products such as, for example, lighter hydrocarbon liquids and gases.

Liquid heavy hydrocarbon materials may be subjected to destructive thermal decomposition to yield cracked liquid and gas, and still lower-value solid petroleum coke. The reactors for thermal decomposition are called cokers, and they may be fluidized bed reactors or stationary drums. Even though the resulting liquid products are higher-value, they still require much upgrading by reaction with hydrogen to be blended with other petroleum products.

Other outlets for liquid heavy hydrocarbon materials include blending with lower viscosity distillates to make residual fuel oil, or use as paving or roofing asphalts, which are also considered low-value uses.

Liquid heavy hydrocarbon materials may also be converted to low and medium BTU gases (syngas and methane-enriched synthesis gas) via catalytic and non-catalytic (thermal) gasification processes. The catalytic gasification (hydromethanation) of such materials in the presence of a catalyst source, hydrogen, carbon monoxide and steam at elevated temperatures and pressures to produce methane and other value-added gases is disclosed, for example, in U.S. Pat. No. 6,955,695, US2010/0071262A1, US2010/0076235A1, WO2010/033848A2 and WO2010/048493A2.

A need, however, remains for processes that can produce even higher value products, such as light olefins along with methane and other higher-value gaseous hydrocarbons, from liquid heavy hydrocarbon materials.

One such process is disclosed in U.S. Pat. No. 3,898,299, in which an atmospheric petroleum residue is first hydrogenated, then vacuum distilled into a liquid phase and a vacuum residue phase. The resulting lighter liquid phase is then thermally cracked (non-catalytically pyrolyzed) in the presence of steam to generate olefins. This process, however, only seems to utilize the lighter portions of the atmospheric petroleum residue, leaving significant amounts of additional residue material.

A catalytic process for upgrading liquid heavy hydrocarbon materials is disclosed in U.S. Pat. No. 3,816,298, but the disclosed process is focused on intermediate molecular weight liquid products and not lower molecular weight gaseous products. Specifically, the disclosed process converts a liquid heavy hydrocarbon material into a sulfur-reduced "normally liquid hydrocarbon product" (having an atmospheric boiling point of greater than 70° F.) and a hydrogen-containing gas by contacting the material with hydrogen and a carbon oxide-containing gas, at a pressure above 150 psig and a temperature between about 700° F. and 1100° F., in a first reaction zone containing a supported alkali metal catalyst. A solid material (coke) is also produced, which deposits on the supported alkali metal catalyst. A portion of the supported alkali metal catalyst is then fed to a second reaction zone where is it contacted with steam and optionally oxygen at a pressure above 150 psig and a temperature above 1200° F. to consume the deposited carbon, thereby regenerating the supported catalyst and producing hydrogen, carbon oxide-containing gas and heat energy for the first reaction zone. The hot regenerated support is also fed back into the first reaction zone. The first reaction zone of this process is thus essentially a coker unit, and the second reaction zone is essentially a gasification unit. The desired liquid products from this process include, for example, gasoline, heating oil and gas oil cuts. While there appear to be unsaturated compounds in the liquid product, it is actually a stated benefit of the disclosed process to reduce unsaturated components as they are detrimental, for example, in gasoline products. There is also no disclosure of the production of light olefins such as ethylene and propylene.

Several references also disclose the production of olefins from various residue feedstocks including, for example, U.S. Pat. No. 4,975,181, U.S. Pat. No. 4,980,053, U.S. Pat. No. 6,179,993, U.S. Pat. No. 6,303,842, WO2007/149917A1 and other disclosures cited therein. Generally, in these disclosures, the petroleum reside feedstock is contacted with a fluidized bed of heated solids and optionally a catalyst component (which may be the same or a separate component from the heated solids) at elevated temperatures and short contact times. A vapor phase is produced with light olefins and other light hydrocarbons, and coke is deposited on the heated particles. The coke-coated particles are regenerated and heated typically by burning off the coke. Catalysts are typically acidic components such as refractory metal oxides and aluminates, zeolites and spent fluid catalytic cracking catalysts, vanadium rich flue fines, spent bauxite and mixtures.

Notwithstanding the existing processes, a need still remains for additional processes for converting lower-value liquid heavy hydrocarbon materials into higher-value gaseous product mixes including light olefins and alkanes.

SUMMARY OF THE INVENTION

In one aspect, the invention provides a process for generating a gaseous raw product stream from a liquid heavy hydrocarbon material, the process comprising the steps of:

(a) dispersing the liquid heavy hydrocarbon material in a gaseous carrier to produce a dispersed heavy hydrocarbon feed;

(b) introducing a superheated gas feed stream comprising heat energy and steam, and optionally carbon monoxide and hydrogen, into a reactor containing a bed of an alkali metal-impregnated carbonaceous carrier;

(c) optionally introducing an oxygen-rich stream into the reactor to generate heat energy and, optionally, carbon monoxide and hydrogen in situ;

(d) contacting the dispersed heavy hydrocarbon feed with steam, carbon monoxide and hydrogen in the presence of the bed of the alkali metal-impregnated carbonaceous carrier, at an elevated pressure and at a temperature of from about 1100° F. to about 1400° F., to generate a raw gaseous mixture comprising methane, one or both of ethylene and propylene, and one or both of ethane and propane; and (e) withdrawing a stream of the raw gaseous mixture from the reactor as the gaseous raw product stream, wherein the reaction in step (d) has a syngas demand, and the syngas demand is at least substantially satisfied by carbon monoxide and hydrogen that may be present in the superheated gas feed stream, and by carbon monoxide and hydrogen that may be generated in step (c).

The process in accordance with the present invention is useful, for example, for producing higher-value gaseous products from lower-value liquid heavy hydrocarbon feedstocks.

These and other embodiments, features and advantages of the present invention will be more readily understood by those of ordinary skill in the art from a reading of the following detailed description.

DETAILED DESCRIPTION

Figure 1:
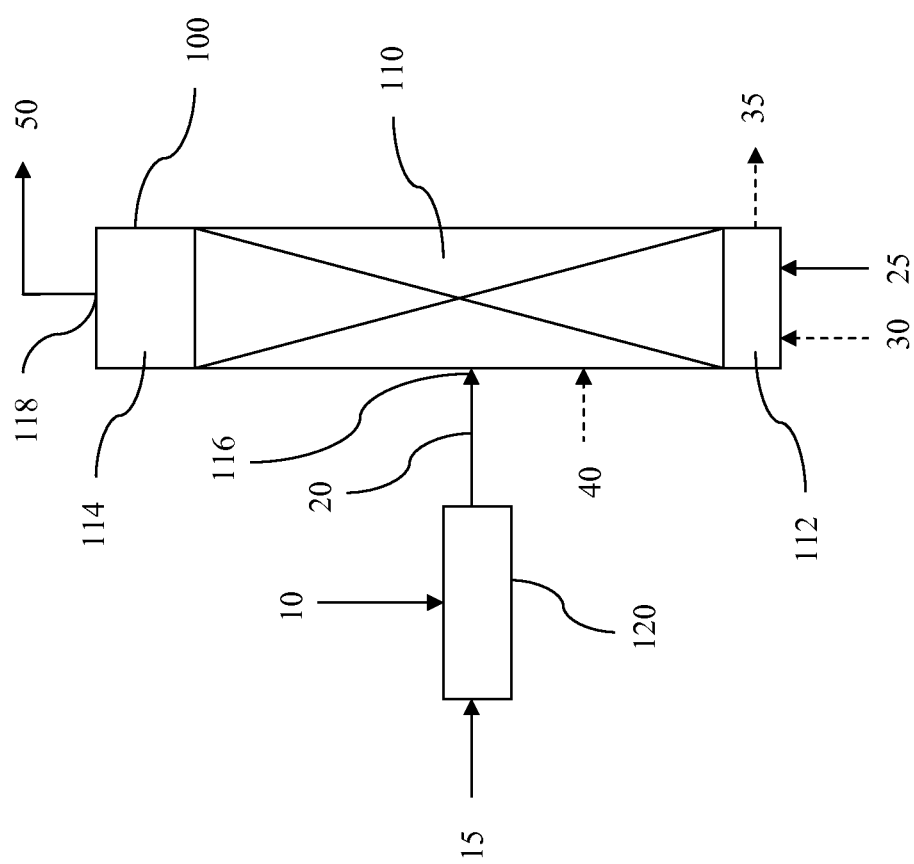
FIG. 1 is a diagram of a first embodiment of a process in accordance with the present invention whereby a gaseous raw product stream containing lower alkanes and lower olefins is produced from a liquid heavy hydrocarbon material in a vertical fluidized bed reactor.

The present invention relates to processes for converting a liquid heavy hydrocarbon material ultimately into a gaseous product stream containing significant amounts light olefins and light alkanes. Further details are provided below.

In the context of the present description, all publications, patent applications, patents and other references mentioned herein, if not otherwise indicated, are explicitly incorporated by reference herein in their entirety for all purposes as if fully set forth.

Unless otherwise defined, all technical and scientific terms used herein have the same meaning as commonly understood by one of ordinary skill in the art to which this disclosure belongs. In case of conflict, the present specification, including definitions, will control.

Except where expressly noted, trademarks are shown in upper case.

Although methods and materials similar or equivalent to those described herein can be used in the practice or testing of the present disclosure, suitable methods and materials are described herein.

Unless stated otherwise, all percentages, parts, ratios, etc., are by weight.

Unless stated otherwise, pressures expressed in psi units are gauge, and pressures expressed in kPa units are absolute.

When an amount, concentration, or other value or parameter is given as a range, or a list of upper and lower values, this is to be understood as specifically disclosing all ranges formed from any pair of any upper and lower range limits, regardless of whether ranges are separately disclosed. Where a range of numerical values is recited herein, unless otherwise stated, the range is intended to include the endpoints thereof, and all integers and fractions within the range. It is not intended that the scope of the present disclosure be limited to the specific values recited when defining a range.

When the term "about" is used in describing a value or an end-point of a range, the disclosure should be understood to include the specific value or end-point referred to.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but can include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The use of "a" or "an" to describe the various elements and components herein is merely for convenience and to give a general sense of the disclosure. This description should be read to include one or at least one and the singular also includes the plural unless it is obvious that it is meant otherwise.

The term "substantial portion", as used herein, unless otherwise defined herein, means that greater than about 90% of the referenced material, preferably greater than about 95% of the referenced material, and more preferably greater than about 97% of the referenced material. The percent is on a molar basis when reference is made to a molecule (such as methane, carbon dioxide, carbon monoxide and hydrogen sulfide), and otherwise is on a weight basis.

The term "predominant portion", as used herein, unless otherwise defined herein, means that greater than about 50% of the referenced material. The percent is on a molar basis when reference is made to a molecule (such as hydrogen, methane, carbon dioxide, carbon monoxide and hydrogen sulfide), and otherwise is on a weight basis.

The term "depleted" is synonymous with reduced. For example, removing a substantial portion of a material from a stream would produce a material-depleted stream that is substantially depleted of that material.

The term "carbonaceous" as used herein is synonymous with hydrocarbon.

The term "carbonaceous material" as used herein is a material containing organic hydrocarbon content. Carbonaceous materials can be classified as biomass or non-biomass materials as defined herein.

The term "biomass" as used herein refers to carbonaceous materials derived from recently (for example, within the past 100 years) living organisms, including plant-based biomass and animal-based biomass. For clarification, biomass does not include fossil-based carbonaceous materials, such as coal. For example, see US2009/0217575A1 and US2009/0217587A1.

The term "plant-based biomass" as used herein means materials derived from green plants, crops, algae, and trees, such as, but not limited to, sweet sorghum, bagasse, sugarcane, bamboo, hybrid poplar, hybrid willow, *albizia* trees, eucalyptus, alfalfa, clover, oil palm, switchgrass, sudangrass, millet, *jatropha*, and *miscanthus* (e.g., *Miscanthus×giganteus*). Biomass further include wastes from agricultural cultivation, processing, and/or degradation such as corn cobs and husks, corn stover, straw, nut shells, vegetable oils, canola oil, rapeseed oil, biodiesels, tree bark, wood chips, sawdust, and yard wastes.

The term "animal-based biomass" as used herein means wastes generated from animal cultivation and/or utilization. For example, biomass includes, but is not limited to, wastes from livestock cultivation and processing such as animal manure, guano, poultry litter, animal fats, and municipal solid wastes (e.g., sewage).

The term "non-biomass", as used herein, means those carbonaceous materials which are not encompassed by the term "biomass" as defined herein. For example, non-biomass include, but is not limited to, anthracite, bituminous coal, sub-bituminous coal, lignite, petroleum coke, asphaltenes, liquid petroleum residues or mixtures thereof. For example, see US2009/0166588A1, US2009/0165379A1, US2009/0165380A1, US2009/0165361A1, US2009/0217590A1 and US2009/0217586A1.

The terms "petroleum coke" and "petcoke" as used here include both (i) the solid thermal decomposition product of high-boiling hydrocarbon fractions obtained in petroleum processing (heavy residues—"resid petcoke"); and (ii) the solid thermal decomposition product of processing tar sands (bituminous sands or oil sands—"tar sands petcoke"). Such carbonization products include, for example, green, calcined, needle and fluidized bed petcoke.

Resid petcoke can also be derived from a crude oil, for example, by coking processes used for upgrading heavy-gravity residual crude oil (such as a liquid petroleum residue), which petcoke contains ash as a minor component, typically about 1.0 wt % or less, and more typically about 0.5 wt % of less, based on the weight of the coke. Typically, the ash in such lower-ash cokes comprises metals such as nickel and vanadium.

Tar sands petcoke can be derived from an oil sand, for example, by coking processes used for upgrading oil sand. Tar sands petcoke contains ash as a minor component, typically in the range of about 2 wt % to about 12 wt %, and more typically in the range of about 4 wt % to about 12 wt %, based on the overall weight of the tar sands petcoke. Typically, the ash in such higher-ash cokes comprises materials such as silica and/or alumina.

Petroleum coke has an inherently low moisture content, typically, in the range of from about 0.2 to about 2 wt % (based on total petroleum coke weight).

The petroleum coke can comprise at least about 70 wt % carbon, at least about 80 wt % carbon, or at least about 90 wt % carbon, based on the total weight of the petroleum coke. Typically, the petroleum coke comprises less than about 20 wt % inorganic compounds, based on the weight of the petroleum coke.

The term "asphaltene" as used herein is an aromatic carbonaceous solid at room temperature, and can be derived, for example, from the processing of crude oil and crude oil tar sands.

The term "coal" as used herein means peat, lignite, sub-bituminous coal, bituminous coal, anthracite, or mixtures thereof. In certain embodiments, the coal has a carbon content of less than about 85%, or less than about 80%, or less than about 75%, or less than about 70%, or less than about 65%, or less than about 60%, or less than about 55%, or less than about 50% by weight, based on the total coal weight. In other embodiments, the coal has a carbon content ranging up to about 85%, or up to about 80%, or up to about 75% by weight, based on the total coal weight. Examples of useful coal include, but are not limited to, Illinois #6, Pittsburgh #8, Beulah (ND), Utah Blind Canyon, and Powder River Basin (PRB) coals. Anthracite, bituminous coal, sub-bituminous coal, and lignite coal may contain about 10 wt %, from about 5 to about 7 wt %, from about 4 to about 8 wt %, and from about 9 to about 11 wt %, ash by total weight of the coal on a dry basis, respectively. However, the ash content of any particular coal source will depend on the rank and source of the coal, as is familiar to those skilled in the art. See, for example, "Coal Data: A Reference", Energy Information Administration, Office of Coal, Nuclear, Electric and Alternate Fuels, U.S. Department of Energy, DOE/EIA-0064(93), February 1995.

The ash produced from combustion of a coal typically comprises both a fly ash and a bottom ash, as are familiar to those skilled in the art. The fly ash from a bituminous coal can comprise from about 20 to about 60 wt % silica and from about 5 to about 35 wt % alumina, based on the total weight of the fly ash. The fly ash from a sub-bituminous coal can comprise from about 40 to about 60 wt % silica and from about 20 to about 30 wt % alumina, based on the total weight of the fly ash. The fly ash from a lignite coal can comprise from about 15 to about 45 wt % silica and from about 20 to about 25 wt % alumina, based on the total weight of the fly ash. See, for example, Meyers, et al. "Fly Ash. A Highway Construction Material," Federal Highway Administration, Report No. FHWA-IP-76-16, Washington, D.C., 1976.

The bottom ash from a bituminous coal can comprise from about 40 to about 60 wt % silica and from about 20 to about 30 wt % alumina, based on the total weight of the bottom ash. The bottom ash from a sub-bituminous coal can comprise from about 40 to about 50 wt % silica and from about 15 to about 25 wt % alumina, based on the total weight of the bottom ash. The bottom ash from a lignite coal can comprise from about 30 to about 80 wt % silica and from about 10 to about 20 wt % alumina, based on the total weight of the bottom ash. See, for example, Moulton, Lyle K. "Bottom Ash and Boiler Slag," Proceedings of the Third International Ash Utilization Symposium, U.S. Bureau of Mines, Information Circular No. 8640, Washington, D.C., 1973.

A material such as methane can be biomass or non-biomass under the above definitions depending on its source of origin.

A "non-gaseous" material is substantially a liquid, semi-solid, solid or mixture at ambient conditions. For example, coal, petcoke, asphaltene and liquid petroleum residue are non-gaseous materials, while methane and natural gas are gaseous materials.

The term "unit" refers to a unit operation. When more than one "unit" is described as being present, those units are operated in a parallel fashion. A single "unit", however, may comprise more than one of the units in series, or in parallel, depending on the context. For example, an acid gas removal unit may comprise a hydrogen sulfide removal unit followed in series by a carbon dioxide removal unit. As another example, a contaminant removal unit may comprise a first removal unit for a first contaminant followed in series by a second removal unit for a second contaminant. As yet another example, a compressor may comprise a first compressor to compress a stream to a first pressure, followed in series by a second compressor to further compress the stream to a second (higher) pressure.

The term "syngas demand" refers to the maintenance of a substantially steady-state syngas balance in the reactor. In the overall desirable steady-state reaction, it appears that hydrogen and carbon monoxide are generated and consumed in relative balance, and both hydrogen and carbon monoxide are typically withdrawn as part of the gaseous products. Hydrogen and carbon monoxide, therefore, must be added to (and/or optionally separately generated in situ via a combustion/oxidation reaction with supplied oxygen as discussed below) the reactor in an amount at least required to substantially maintain this reaction balance. For the purposes of the present invention, the amount of hydrogen and carbon monoxide that must be "added" (fed to the reactor and generated in situ) for the reaction is the "syngas demand".

The term "steam demand" refers to the amount of steam that must be added to the reactor. Steam can be added, for example, via steam in the superheated gas feed stream, the dispersed heavy hydrocarbon stream, the optional oxygen-rich stream and/or as a separate steam stream. The amount of steam to be added (and the source) is discussed in further detail below. Steam generated in situ from vaporization of any moisture content of the feedstock or replacement catalyst feed can assist in satisfying the steam demand; however, it should be noted that any steam generated in situ or fed into the reactor at a temperature lower than the reactor operating temperature will have an impact on the "heat demand" for the reaction.

The term "heat demand" refers to the amount of heat energy that must be added to the reactor to keep the reaction of step (d) in substantial thermal balance, as further detailed below.

The materials, methods, and examples herein are illustrative only and, except as specifically stated, are not intended to be limiting.

Liquid Heavy Hydrocarbon Materials

The present invention concerns the processing of "liquid heavy hydrocarbon materials" which, in accordance with the present invention, are viscous liquid or semi-solid carbonaceous materials that are flowable liquids at ambient conditions, or can be made flowable liquids at the elevated temperature conditions utilized as the feed conditions for the present process (discussed in further detail below), such that the materials can be dispersed in a gaseous carrier for use in the process of the present invention.

Non-limiting examples of liquid heavy hydrocarbon materials include vacuum resids; atmospheric resids; heavy and reduced petroleum crude oils; pitch, asphalt and bitumen (naturally occurring as well as resulting from petroleum refining processes); tar sand oil; shale oil; bottoms from catalytic cracking processes; coal liquefaction bottoms; and other hydrocarbon feedstreams containing significant amounts of heavy or viscous materials such as petroleum wax fractions.

The liquid heavy hydrocarbon materials may inherently contain minor amounts of solid carbonaceous materials, such as petroleum coke and/or solid asphaltenes, that are generally dispersed within the liquid heavy hydrocarbon matrix, and that remain solid at the elevated temperature conditions utilized as the feed conditions for the present process.

In addition, minor amounts of solid carbonaceous materials may be added to the liquid heavy hydrocarbon material for use in the present invention. Non-limiting examples of such solid carbonaceous materials include petroleum coke, solid asphaltenes, coal and biomass. Recycle/replacement alkali metal-impregnated carbonaceous carrier may also be a solid carbonaceous material added to the liquid heavy hydrocarbon material. Typically, the solid carbonaceous materials should be of a particle size suitable for dispersion within the liquid heavy hydrocarbon matrix, but may also be partially utilized in a particulate form coated with liquid heavy hydrocarbon material, so long as the resulting material is dispersible in the gaseous carrier utilized to prepare the dispersed heavy hydrocarbon feed.

The carbonaceous content of the dispersed liquid heavy hydrocarbon feed should predominantly comprise the liquid heavy hydrocarbon material.

General Process Information

Figure 2:
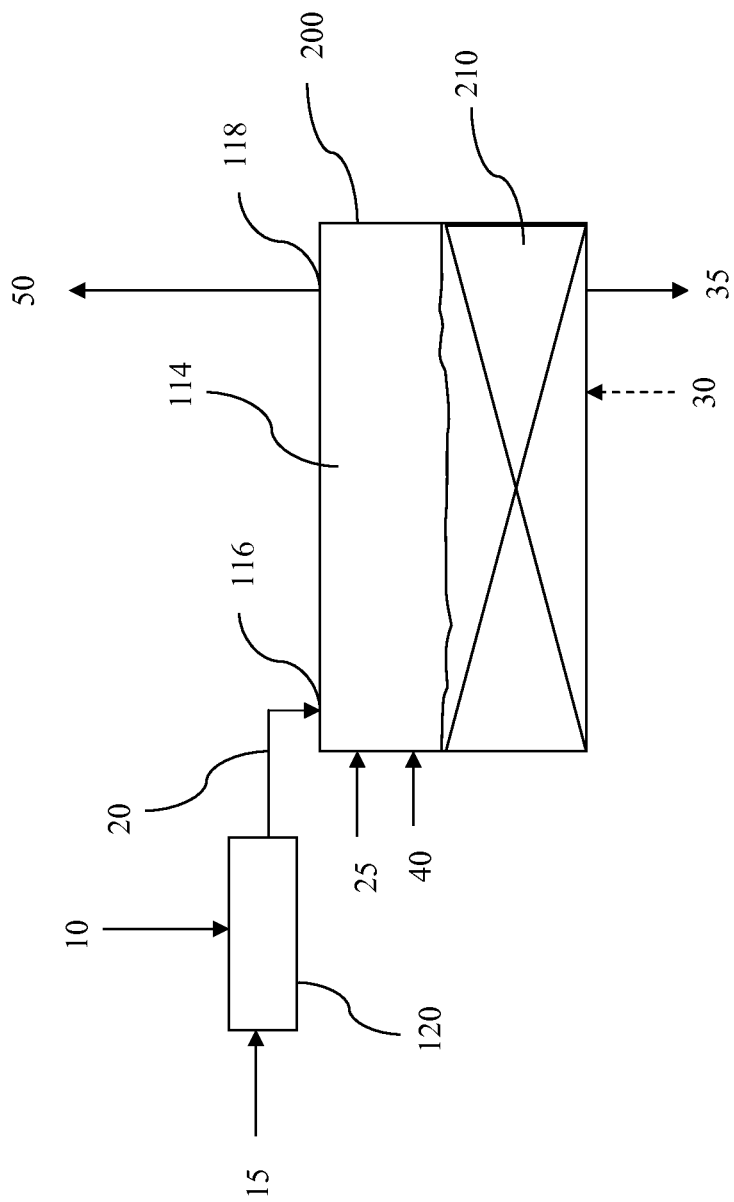
FIG. 2 is a diagram of a second embodiment of a process in accordance with the present invention whereby a gaseous raw product stream containing lower alkanes and lower olefins is produced from a liquid heavy hydrocarbon material in a horizontal moving bed reactor.

In embodiments of the invention, as illustrated in FIGS. 1 and 2, a liquid heavy hydrocarbon material stream (10) is combined with a gaseous carrier stream (15) in a mixing vessel or device. (120), where the liquid heavy hydrocarbon material is dispersed in the gaseous carrier to generate a dispersed heavy hydrocarbon feed stream (20). In one embodiment, the liquid heavy hydrocarbon material is atomized in the gaseous carrier to generate an atomized heavy hydrocarbon feed stream.

Dispersion can take place via conventional means, for example, in an online mixer with static mixers to mix the feed stream flowing at a specific rate with appropriate amount of steam injected to create a steam-rich dispersion of feed, or the dispersion can be created via injection nozzles as part of feed inlet (116) to reactor (100/200).

Suitable gaseous carriers include, for example, steam, carbon dioxide, syngas (mixtures containing carbon monoxide and hydrogen), inert gases such as nitrogen, and mixtures of the above. Typically, the gaseous carrier will be steam, or mixtures of a predominant or substantial portion of steam with, optionally, minor amounts of one or more of the other gases mentioned above. In one embodiment, the gaseous carrier stream is steam mixed with carbon dioxide, desirably under such conditions that the carbon dioxide is supercritical.

Gaseous carrier stream (15) will typically be superheated, and liquid heavy hydrocarbon material stream (10) will be heated, to temperatures such that, after combination, the resulting dispersed heavy hydrocarbon stream (20) will be at an elevated temperature suitable for feeding into the reactor (100/200) without additional heating, but additional heating via conventional means may be utilized if needed. The temperature of dispersed heavy hydrocarbon feed stream (20) will typically be about 900° F. (about 482° C.) or less, or about 850° F. (about 454° C.) or less, at the feed point (116) of dispersed heavy hydrocarbon stream into the reactor (100/200), to assist in minimizing premature coke formation and potential blockage of the feed point (116).

The pressure of the dispersed heavy hydrocarbon feed stream (20) should also be higher than at the feed point (116) of dispersed heavy hydrocarbon stream into the reactor (100/200). If necessary, dispersed heavy hydrocarbon feed stream

(20) may be compressed subsequent to mixing vessel (120) by conventional means as necessary prior to feeding into reactor (100/200).

Desirably, as indicated above, when carbon dioxide is used as, or as a component of, gaseous carrier stream (15), the temperature and pressure conditions of dispersed heavy hydrocarbon feed stream (20) are such that the carbon dioxide is in a supercritical state.

Supplemental or make-up catalyst may also be included as part of dispersed heavy hydrocarbon feed stream (20).

Reactor (100) from FIG. 1 contains a vertical bed (110) of an alkali metal-impregnated carbonaceous carrier into which the dispersed heavy hydrocarbon feed stream (20) is fed. Reactor (200) from FIG. 2 contains a horizontal bed (210) of the alkali metal-impregnated carbonaceous carrier onto which the dispersed heavy hydrocarbon feed stream (20) is fed.

The alkali metal-impregnated carbonaceous carrier is a carbon support containing an alkali metal catalyst and, optionally, one or more co-catalyst materials. Examples of suitable alkali metal-impregnated carbonaceous carriers include, for example, those disclosed in U.S. Pat. No. 3,958,957 and US2010/0121125A1. Further details are provided below.

A superheated gas stream (25) comprising steam and, optionally, hydrogen and carbon monoxide, is also fed into reactor (100/200). In one embodiment, superheated gas stream (25) comprises hydrogen and carbon monoxide. The hydrogen and carbon monoxide content of superheated gas stream (25) can be generated in a syngas generator, which can also be used for superheating superheated gas stream (25) or other process streams such as gaseous carrier stream (15) and/or dispersed heavy hydrocarbon feed stream (20), as discussed below.

In reactor (100/200), the dispersed heavy hydrocarbon feed is contacted with steam, hydrogen and carbon monoxide, and with bed (110/210) (in the presence of the alkali metal-impregnated carbonaceous carrier), where it is believed that a number of chemical and physical processes take place.

The result is the generation of a raw gaseous mixture comprising methane, one or both of ethylene and propylene (typically a mixture of both), and one or both of ethane and propane (typically a mixture of both), as well as minor amounts of additional hydrocarbon materials (saturated and/or unsaturated) of increasing molecular weight, and other optional components and contaminants as discussed below.

The temperature in reactor (100/200) will be from about 1100° F. (about 593° C.), or from about 1200° F. (about 649° C.), of from about 1250° F. (about 677° C.), to about 1400° F. (about 760° C.), or to about 1350° F. (about 732° C.).

The pressure in reactor (100/200) will be elevated (superatmospheric), typically from about 50 psig (about 446 kPa), or from about 100 psig (about 791 kPa), or from about 250 psig (about 1825 kPa), or from about 450 psig (about 3204 kPa), to about 1000 psig (about 6996 kPa), or to about 600 psig (about 4238 kPa), or to about 550 psig (about 3894 kPa).

The temperature and pressure conditions in reactor (100/200) appear to have a significant impact on the ultimate product mix (ethylene versus propylene, ethane versus propane); therefore, the desired product mix will be a significant factor in determining operating temperature and pressure conditions for reactor (100/200).

In addition to the generation of the raw gaseous mixture, a portion of the carbon content of the feed appears to deposit on the carbonaceous carrier as a solid, for example, as a coke. Again, temperature and pressure conditions in reactor (100/200) appear to have a significant impact on the amount of coke formation (versus conversion into the raw gaseous mixture), which again affects the ultimate raw gaseous mixture.

Also, depending on the conditions in reactor (100/200), a portion of the carbon content from the carbonaceous carrier material (original or deposited coke), as well as the heavy hydrocarbon feed, appears to gasify into a syngas mixture (carbon monoxide and hydrogen) or hydromethanates into a methane-enriched synthesis gas (methane, carbon monoxide and hydrogen), which may be further methanated or otherwise converted in reactor (100/200) as part of the raw gaseous mixture. Gasification/hydromethanation can be promoted in reactor (100/200), for example, in a portion of bed (110/210) (not depicted) or a separate section of reactor (100/200) (not depicted), or in a separate reactor (not depicted), as discussed below.

Desirably, the reactions in reactor (100/200) are balanced in that the amount of carbon material depositing on the carbonaceous carrier material is substantially balanced with the amount of material being removed from carbonaceous carrier material. In practice, however, alkali metal-impregnated carbonaceous carrier material will be periodically removed from reactor (100/200), for example via bleed stream (35), and fresh and/or regenerated alkali metal-impregnated carbonaceous carrier material will be fed into reactor (100/200), for example via catalyst feed line (40). Regeneration of alkali metal-impregnated carbonaceous carrier material can take place, for example, in a separate gasification/hydromethanation reactor as discussed below.

Without being bound to any particular theory, it is believe that all of these mechanisms (including optional partial oxidation mentioned below, and possibly others) contribute to the final raw gaseous mixture composition which, in addition to the hydrocarbon components, will typically also contain unconverted steam, as well as other optional components such as hydrogen, carbon monoxide, carbon dioxide, hydrogen sulfide and ammonia, depending on reaction conditions as well as the compositions of liquid heavy hydrocarbon material and the carbonaceous carrier.

The conversion of the liquid heavy hydrocarbon material in reactor (100/200) is overall endothermic. Additionally, there will be process heat losses, including those due to any required in situ heating of any feeds that may be provided to reactor (100/200) at a temperature lower than the operating temperature of reactor (100/200). Consequently, heat energy must be added to reactor (100/200) and/or generated in situ to maintain thermal balance. As defined above, the amount of heat energy that must be added to reactor (100/200) to maintain thermal balance is the heat demand of the reaction.

Optionally, an oxygen-rich stream (30) may also be fed into reactor (100/200), for example, to assist in temperature control, and/or to provide additional hydrogen and carbon monoxide in situ, as discussed below.

The resulting gaseous raw product stream (50) will typically be subject to one or more downstream processing steps including, for example, cooling/quenching and heat recovery, entrained solids separation, component separation (for example, to recover the olefins content, ammonia and hydrogen removal), component upgrading (for example, acid gas removal, desulfurization, shift and/or methanation) and component consumption (for example, combustion for power/steam/heat generation, and/or partial oxidation for syngas/heat/steam generation).

Additional details and embodiments are provided below.

Reactor (100/200)

Any of several types of gasification reactors can be utilized for reactor (100/200). Suitable reactors include those having a reaction chamber which is a counter-current fixed bed, a co-current fixed bed, a fluidized bed, or an entrained flow or moving bed reaction chamber.

Reactor (100) from FIG. 1 is in a vertical configuration, and is typically a fluidized-bed reactor. Reactor (100) can, for example, be a "flow down" countercurrent configuration (as specifically depicted in FIG. 1), where the dispersed heavy hydrocarbon feed (20) is introduced at a higher point so that there is some flow down of heavier components through bed (110), the gases (such as superheated gas feed stream (25)) flow in an upward direction and are removed at a removal point (118) above the fluidized bed, and heavier components (such as "spent" catalyst particles) are removed from a point near or below bed (110) (such as bleed line (35)). Alternatively, reactor (100) can be a "flow up" co-current configuration, where the dispersed heavy hydrocarbon feed (20) is fed at a lower point so that the flow is up bed (110), along with the gases (such as superheated gas feed stream (25)).

In both types of configurations for reactor (100), there will typically be a collection zone (112) at the bottom of reactor (100) for larger particles that are not fluidized, and a disengagement zone (114) at the top of reactor (100) to assist in disengagement of particulate matter from the raw gaseous mixture as it is withdrawn from reactor (100).

Reactor (200) from FIG. 2 is a horizontal configuration with a bed (120) that is a moving bed. Typically in such a configuration, the dispersed heavy hydrocarbon feedstream (20), the superheated gas feed stream (25) and the catalyst feed line (40) are fed at a one end of reactor (200), and gaseous raw product stream (50) and catalyst bleed stream (35) are withdrawn at the other end of reactor (200).

Since reactor (100/200) is operated at elevated pressures and temperatures, catalyst bed removal and replenishment requires introduction and withdrawal of the appropriate carbonaceous carrier to and from a reaction chamber of reactor (100/200) under pressure. Those skilled in the art are familiar with feed inlets and outlets to supply and withdraw the carbonaceous carrier into and from reaction chambers having high pressure and/or temperature environments, including star feeders, screw feeders, rotary pistons and lock-hoppers. It should be understood that the inlets and outlets can include two or more pressure-balanced elements, such as lock hoppers, which would be used alternately. In some instances, the carbonaceous carrier can be prepared or regenerated at pressure conditions above the operating pressure of reactor (100/200) and, hence, the carbonaceous carrier can be directly passed into and removed from reactor (100/200) without further pressurization/depressurization. Gas for pressurization can be an inert gas such as nitrogen, or more typically a stream of superheated steam and/or carbon dioxide.

Gas flow velocities in reactor (100/200) are such to achieve a desired residence time in the reactor, which can vary widely.

In certain embodiments, the gas flow velocity in reactor (100/200), the feed point (116) of dispersed heavy hydrocarbon feed (20) into reactor (100/200), and the removal point (118) of gaseous raw product stream (50) from reactor (100/200), is such that residence time of the vapor phase from any feed point (116) to any removal point (118) is of a short duration, such as less than about 2 seconds, or about 1.5 seconds or less, or about 1 second or less, or about 0.5 seconds or less. To achieve such short residence times, gas flow velocity will typically be about 50 ft/sec (about 15.2 m/sec) or higher, or about 60 ft/sec (about 18.3 m/sec) or higher.

In certain embodiments, longer residence times may be utilized, and typical gas flow velocities in reactor (100/200) can be from about 0.1 ft/sec (about 0.03 m/sec), or from about 0.5 ft/sec (about 0.15 m/sec), or from about 1 ft/sec (about 0.3 m/sec), to about 2.0 ft/sec (about 0.6 m/sec), or to about 1.5 ft/sec (about 0.45 m/sec).

In another embodiment, there are a plurality of feed points for the dispersed heavy hydrocarbon feed, wherein the residence time of the vapor phase from at least one feed point to any removal point is of a short duration, such as less than about 2 seconds, or about 1.5 seconds or less, or about 1 second or less, or about 0.5 seconds or less.

When an oxygen-rich gas stream (30) is also fed into reactor (100/200), a portion of the carbon content from the carbonaceous carrier and potentially the heavy hydrocarbon feedstock can also be consumed in an oxidation/combustion reaction, generating supplemental heat energy as well as carbon monoxide and hydrogen. The variation of the amount of oxygen supplied to reactor (100/200) can provide an advantageous process control. Increasing the amount of oxygen will increase the oxidation/combustion, and therefore increase in situ heat and syngas generation. Decreasing the amount of oxygen will conversely decrease the in situ heat and syngas generation.

When utilized, the oxygen-rich gas stream (30) can be fed into reactor (100/200) by any suitable means such as direct injection of purified oxygen, oxygen-air mixtures, oxygen-steam mixtures, or oxygen-inert gas mixtures into the reactor. See, for instance, U.S. Pat. No. 4,315,753 and Chiaramonte et al., Hydrocarbon Processing, September 1982, pp. 255-257.

The oxygen-rich gas stream (30) is typically generated via standard air-separation technologies, and may be fed as a high-purity oxygen stream (about 95% or greater volume percent oxygen, dry basis). Typically, however, the oxygen-rich gas stream will be provided as a mixture with steam, and introduced at a temperature of from about 400° F. (about 204° C.), or from about 450° F. (about 232° C.), or from about 500° F. (about 260° C.), to about 750° F. (about 399° C.), or to about 700° F. (about 371° C.), or to about 650° F. (about 343° C.), and at a pressure at least slightly higher than present in reactor (100/200).

When provided to a vertical fluid-bed reactor such as reactor (100), the oxygen-rich gas stream (30) is typically introduced at a point below bed (110) in order to avoid formation of hot spots in the reactor, and to avoid combustion of the gaseous products. The oxygen-rich gas stream (30) can, for example, advantageously be introduced into a collection zone (112) of reactor (100), where non-fluidized particles collect, typically in the bottom of the reactor (for example, below a grid or plate (not depicted) at the bottom of reactor (100)), so that carbon in the non-fluidized particles is preferentially consumed as opposed to carbon in a different zone of reactor (100).

When provided to reactor (200), the oxygen-rich gas stream (30) is typically introduced at the bottom bed (210) at a point with good particle flow in order to avoid formation of hot spots in reactor (200).

Without being bound by any particular theory of operation, under the operating conditions utilized in connection with the present invention, some level of hydromethanation/gasification also appears to occur in reactor (100/200). Hydromethanation/gasification can involve several different reactions including, for example:

Steam carbon: $C + H_2O \rightarrow CO + H_2$ (I)

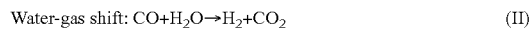
Water-gas shift: $CO + H_2O \rightarrow H_2 + CO_2$ (II)

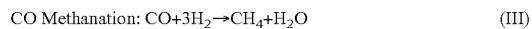
CO Methanation: $CO + 3H_2 \rightarrow CH_4 + H_2O$ (III)

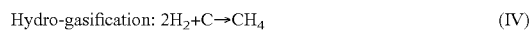
Hydro-gasification: $2H_2 + C \rightarrow CH_4$ (IV)

In the hydromethanation reaction, the first three reactions (I-III) predominate to result in the following overall reaction:

$$2C+2H_2O \rightarrow CH_4+CO_2 \qquad (V).$$

In hydromethanation, carbon monoxide and hydrogen are generated and consumed in relative balance, so a hydromethanation reaction in and of itself will generate a methane-enriched synthesis gas.

In a standard steam gasification reaction, reaction (I) predominates. If oxygen is available, partial combustion/oxidation may also occur.

Hydromethanation is a catalytic process and, as indicated above, appears to occur to some extent in the presence of the alkali metal-impregnated carbonaceous carrier. Standard gasification is a typically non-catalytic (thermal process), but reaction (I) can be promoted by the presence of an alkali metal catalyst.

At the temperature and pressure conditions in reactor (100/200), hydromethanation will generally predominate over conventional gasification in bed (110/210). Hydromethanation conditions are generally disclosed in various references as incorporated in the "Catalyst Bed Recycle/Regeneration" section below.

Desirably, conditions in reactor (100/200) are such that at least a portion of carbon content of the alkali metal-impregnated carbonaceous carrier (either original carbon content or, more desirably, coke deposited on the carrier) hydromethanates to increase the methane content of the raw gaseous mixture and, ultimately, the gaseous raw product stream (50) withdrawn from reactor (100/200).

In certain embodiments, it is desirable that the reaction conditions are such that the deposition of carbon material on, and consumption (via gasification, hydromethanation, combustion and/or partial oxidation) of carbon from, the alkali metal-impregnated carbonaceous carrier is in substantial balance.

In other embodiments, it is desirable that the reaction conditions are such that the deposition of carbon material on the alkali metal-impregnated carbonaceous carrier is greater than the consumption of carbon from the alkali metal-impregnated carbonaceous carrier. In such a case, alkali metal-impregnated carbonaceous carrier can be removed from reactor (100/200) via bleed line (35) where it can be regenerated, for example, via gasification, hydromethanation, combustion and/or partial oxidation of carbon from the alkali metal-impregnated carbonaceous carrier in a separate reactor (not depicted), such as in separate a hydromethantion reactor as disclosed in various references as incorporated in the "Catalyst Bed Recycle/Regeneration" section below.

As indicated above, the reactions that take place in reactor (100/200) have a syngas demand, a steam demand and a heat demand. These conditions in combination are important factors in determining the operating conditions for reactor (100/200) as well as the other parts of the process.

Typically, the overall weight ratio of steam:liquid heavy hydrocarbon feed supplied to reactor (100/200) is about 0.5 or greater, or about 0.75 or greater, or about 1 or greater, or about 1.5 (or greater), to about 6 (or less), or to about 5 (or less), or to about 4 (or less), or to about 3 (or less), or to about 2 (or less). The steam demand should be satisfied by steam in the dispersed heavy hydrocarbon stream (20), superheated gas feed stream (25) and (if present) oxygen-rich stream (30); however, if needed, additional steam may also be added to reactor (100/200) apart from these streams.

Advantageously, steam for the process is generated from other process operations through process heat capture (such as generated in a waste heat boiler, generally referred to as "process steam" or "process-generated steam") and, in some embodiments, is solely supplied as process-generated steam. For example, process steam streams generated by a heat exchanger unit or waste heat boiler, and/or from other downstream gas processing steps such as shifting and/or methanating syngas content that may be present in gaseous raw product stream (50), can ultimately be fed to reactor (100/200).

In certain embodiments, the overall process described herein is at least substantially steam neutral, such that steam demand (pressure and amount) for the reaction can be satisfied via heat exchange with process heat at the different stages therein, or steam positive, such that excess steam is produced and can be used, for example, for power generation. Desirably, process-generated steam accounts for greater than about 95 wt %, or greater than about 97 wt %, or greater than about 99 wt %, or about 100 wt % or greater, of the steam demand of the hydromethanation reaction.

As also indicated above, heat must be added to reactor (100/200), as the reaction in reactor (100/200) is endothermic, plus there will be process heat losses. The addition of the superheated feed gas stream (25) and dispersed heavy hydrocarbon stream (20), plus the optional partial in situ combustion/oxidation of carbon in the presence of the oxygen introduced into reactor (100/200) from oxygen-rich gas stream (30) (if present), should be sufficient to substantially satisfy the heat demand of the reaction.

The temperature in reactor (100/200) can be controlled, for example, by controlling the amount and temperature of the superheated feed gas stream (25), as well as the amount of optional oxygen or separately-supplied superheated steam (as discussed above), supplied to reactor (100/200).

The result of the overall process is a raw product, which is withdrawn from reactor (100/200) as gaseous raw product stream (50) typically comprising more than trace amounts of methane, ethane, propane, ethylene and propylene, as well as unreacted steam, entrained fines and, optionally, other components and contaminants such as hydrogen, carbon dioxide, carbon monoxide, hydrogen sulfide and ammonia, depending on the nature of the carbonaceous material utilized for the feedstock and carbonaceous carrier.

The gaseous raw product stream (50), upon exiting the reactor (100/200), will typically comprise at least about 30 mol % (dry basis) of lower alkanes (methane+ethane+propane), and/or at least about 8 mol % lower olefins (ethylene+propylene).

Alkali Metal-Impregnated Carbonaceous Material and Bed (110/210)

The alkali metal-impregnated carbonaceous material used in bed (110/210) is a particulate carbonaceous carrier material, such as particulate biomass and/or non-biomass, that contains an amount of alkali metal effective to catalyze the reactions that take place in reactor (100/200) such that the methane, ethane, propane, ethylene and propylene are the predominant hydrocarbon gaseous products resulting from the reactions.

The carbonaceous carrier can be prepared via crushing and/or grinding one or more carbonaceous materials, either separately or together, according to any methods known in the art, such as impact crushing and wet or dry grinding to yield one or more carbonaceous particulates. Depending on the method utilized for crushing and/or grinding of the carbonaceous material sources, the resulting carbonaceous particulates may be sized (i.e., separated according to size) to provide the an appropriate carbonaceous carrier for use in reactor (100/200).

Any method known to those skilled in the art can be used to size the particulates. For example, sizing can be performed by screening or passing the particulates through a screen or number of screens. Screening equipment can include grizzlies, bar screens, and wire mesh screens. Screens can be static or incorporate mechanisms to shake or vibrate the screen. Alternatively, classification can be used to separate the carbonaceous particulates. Classification equipment can include ore sorters, gas cyclones, hydrocyclones, rake classifiers, rotating trommels or fluidized classifiers. The carbonaceous materials can be also sized or classified prior to grinding and/or crushing.

Typically, the carbonaceous carrier is supplied as a fine particulate having an average particle size of from about 25 microns, or from about 45 microns, up to about 2500 microns, or up to about 500 microns. One skilled in the art can readily determine the appropriate particle size for the carbonaceous particulates. For example, when a fluidized bed reactor is used, such carbonaceous particulates can have an average particle size which enables incipient fluidization of the carbonaceous materials at the gas velocity used in the fluidized bed reactor.

Desirable particle size ranges for bed (110) are in the Geldart A and Geldart B ranges (including overlap between the two), depending on fluidization conditions, typically with limited amounts of fine (below about 25 microns) and coarse (greater than about 250 microns) material.

Desirable particle size ranges for bed (210) range from about 40 microns, or from about 200 microns, or from about 400 microns, up to about 2000 microns, or up to about 1000 microns, or up to about 800 microns, typically with limited amounts of fine and coarse material.

The alkali metal-impregnated carbonaceous material can also, for example, be a hydromethanation char by-product, such as resulting from the various hydromethanation processes disclosed in the previously incorporated references. See, for example, previously incorporated US2010/0121125A1.

When a fresh carbon particulate (such as, for example, an activated carbon support) is utilized, catalyst may be loaded onto that materials as disclosed, for example, in previously incorporated U.S. Pat. No. 3,958,957, or as described for the preparation of particulate carbonaceous materials for hydromethanation processes. See, for example, US2009/0048476A1, US2010/0168495A1 and US2010/0168494A1.

Typically, the alkali metal, it is present in the catalyzed particulate in an amount sufficient to provide a ratio of alkali metal atoms to carbon atoms in the catalyzed particulate ranging from about 0.01, or from about 0.05, or from about 0.1, or from about 0.2, to about 1, or to about 0.8, or to about 0.6, or to about 0.5.

Suitable alkali metals are lithium, sodium, potassium, rubidium, cesium, and mixtures thereof. Particularly useful are potassium sources. Suitable alkali metal compounds include alkali metal carbonates, bicarbonates, formates, oxalates, amides, hydroxides, acetates, or similar compounds. For example, the catalyst can comprise one or more of sodium carbonate, potassium carbonate, rubidium carbonate, lithium carbonate, cesium carbonate, sodium hydroxide, potassium hydroxide, rubidium hydroxide or cesium hydroxide, and particularly, potassium carbonate and/or potassium hydroxide.

Optional co-catalysts or other catalyst additives may be utilized, such as those disclosed in the hydromethanation references incorporated below in the "Catalyst Bed Recycle/Regeneration" section.

Catalyst Bed Recycle/Regeneration

In fluidized bed reactor such as reactor (100), a portion of the bed (110) will typically need to be removed and replaced from time to time as buildup of contaminants occurs. The amount and frequency of bed turnover will predominantly be a factor of how much coke deposits and remains on the carbonaceous carrier. Other factors include, for example, the amount of ash and other contaminant content of the liquid heavy hydrocarbon feed that may deposit on the carrier particles or otherwise "tie-up" the catalyst component.

In a moving bed reactor such as reactor (200), a portion of bed (210) will be removed and recirculated. Again, the amount and frequency of bed turnover will predominantly be a factor of how much coke deposits and remains on the carbonaceous carrier.

The carbonaceous carrier can be periodically or continuously withdrawn from the reactor (100/200) through an outlet such as a lock hopper system, although other methods are known to those skilled in the art.

As indicated above, one method of removing coke deposits from the alkali-metal carbonaceous carrier is to hydromethanate carbon from the carrier particles to a methane-enriched synthesis gas and a char by-product. The char by-product can be removed from a hydromethanation reactor (not depicted) and recycled back to the reactor (100/200) via catalyst feed line (40).

Catalytic gasification/hydromethanation processes and conditions are disclosed, for example, in, for example, in U.S. Pat. No. 3,828,474, U.S. Pat. No. 3,998,607, U.S. Pat. No. 4,057,512, U.S. Pat. No. 4,092,125, U.S. Pat. No. 4,094,650, U.S. Pat. No. 4,204,843, U.S. Pat. No. 4,468,231, U.S. Pat. No. 4,500,323, U.S. Pat. No. 4,541,841, U.S. Pat. No. 4,551,155, U.S. Pat. No. 4,558,027, U.S. Pat. No. 4,606,105, U.S. Pat. No. 4,617,027, U.S. Pat. No. 4,609,456, U.S. Pat. No. 5,017,282, U.S. Pat. No. 5,055,181, U.S. Pat. No. 6,187,465, U.S. Pat. No. 6,790,430, U.S. Pat. No. 6,894,183, U.S. Pat. No. 6,955,695, US2003/0167961A1, US2006/0265953A1, US2007/0000177A1, US2007/0083072A1, US2007/0277437A1, US2009/0048476A1, US2009/0090056A1, US2009/0090055A1, US2009/0165383A1, US2009/0166588A1, US2009/0165379A1, US2009/0170968A1, US2009/0165380A1, US2009/0165381A1, US2009/0165361A1, US2009/0165382A1, US2009/0169449A1, US2009/0169448A1, US2009/0165376A1, US2009/0165384A1, US2009/0217582A1, US2009/0220406A1, US2009/0217590A1, US2009/0217586A1, US2009/0217588A1, US2009/0218424A1, US2009/0217589A1, US2009/0217575A1, US2009/0229182A1, US2009/0217587A1, US2009/0246120A1, US2009/0259080A1, US2009/0260287A1, US2009/0324458A1, US2009/0324459A1, US2009/0324460A1, US2009/0324461A1, US2009/0324462A1, US2010/0121125A1, US2010/0120926A1, US2010/0071262A1, US2010/0168495A1, US2010/0168494A1, US2010/0292350A1, US2010/0287836A1, US2010/0287835A1, US2011/0031439A1, US2011/0062012A1, US2011/0062722A1, US2011/0064648A1, US2011/0088896A1, US2011/0088897A1, WO2010/048493A2 and GB1599932; U.S. patent application Ser. Nos. 12/970,105 (entitled INTEGRATED ENHANCED OIL RECOVERY PROCESS) and 12/970,111 (entitled INTEGRATED ENHANCED OIL RECOVERY PROCESS), each of which was filed 16 Dec. 2010; U.S. patent application Ser. No. 13/031,486 (entitled INTEGRATED HYDROMETHANATION FUEL CELL POWER GENERATION), filed 21 Feb. 2011; U.S. patent application Ser. No. 13/039,995 (entitled INTEGRATED HYDROMETHANATION FUEL CELL POWER GENERATION), filed 3 Mar. 2011; and U.S. patent application Ser. No. 13/094,438 (entitled HYDROMETHANATION OF A CARBONACEOUS FEEDSTOCK WITH VANADIUM RECOVERY), filed 26 Apr. 2011.

The methane-enriched synthesis gas after processing can be used, for example, as a feed for a syngas generator as described below, or can be otherwise purified/treated/utilized as described in the above-incorporated hydromethanation references.

The coke deposits can also be removed from the alkali-metal carbonaceous carrier via thermal gasification, such as disclosed in previously incorporated U.S. Pat. No. 3,816,298.

The solids resulting from both hydromethanation and thermal gasification will be hot, and can be recirculated back to the reactor (100/200) as hot solids. Doing so will reduce the heat demand of the reactions in the reactor (100/200).

Gas Processing

The gaseous raw product stream (50) exiting the reactor (100/200) will be at the approximate operating temperature and pressure of the reactor (100/200).

Typically, the gaseous raw product stream (50) will first be quenched to a temperature to stop reactions that might consume olefins, such as less than about 1100° F. (about 593° C.), and then subject to solids separation to removed entrained solids. The quenching and solids removal can take place in any fashion known to those of ordinary skill in the relevant art such as, for example, in a fines remover unit (not pictured) incorporated into and/or external of reactor (100/200). Quenching can occur via heat exchange, and solids removal can occur via contact, with an aqueous (steam or water) and/or organic medium (such as a pyrolysis oil or addition resid feedstock) in, for example, a single or multistage cyclone, with the resulting quenched gaseous raw product stream be sent on for further processing, and the quenching medium and separated solids being return to the reactor (100/200) for further processing.

Additional stages of fines removal subsequent to quench can occur, for example, in additional cyclone separators optionally followed by Venturi scrubbers.

Additional heat energy can be removed from the quenched gaseous raw product stream via one or more heat exchanger units, and the recovered heat energy can be used to generate steam for use elsewhere in the process.

Depending on the desired end product, the quenched gaseous raw product stream can be subject to additional processing steps generally known to those of ordinary skill in the art, for example, olefin separation, desulfurization, acid gas removal, water/gas shift and methanation.

In one embodiment, the olefins and acid gases are removed from the quenched gaseous raw product stream, and at least a portion of the resulting sweetened gas stream is fed to a syngas generator, such as a partial oxidation reactor, to reform/partially oxidize hydrocarbon content to additional hydrogen and carbon monoxide content, and heat energy, that can be used to generate superheated gas feed stream (25). A portion of the resulting sweetened gas stream can also be used for generating heat energy (for example, via combustion or external methanation) for superheating and/or steam generation.

In one embodiment, the syngas generator utilizes a gas-fed partial oxidation/reforming process, such as non-catalytic gaseous partial oxidation, catalytic autothermal reforming or catalytic stream-methane reforming process. These processes are generally well-known in the relevant art. See, for example, Rice and Mann, "Autothermal Reforming of Natural Gas to Synthesis Gas, Reference: KBR Paper #2031," Sandia National Laboratory Publication No. SAND2007-2331 (2007); and Bogdan, "Reactor Modeling and Process Analysis for Partial Oxidation of Natural Gas", printed by Febodruk, B. V., ISBN: 90-365-2100-9 (2004).

Technologies and reactors potentially suitable for use in conjunction with the present invention are commercially available from Royal Dutch Shell plc, Siemens AG, General Electric Company, Lurgi AG, Haldor Topsoe A/S, Uhde AG, KBR Inc. and others.

In non-catalytic gaseous partial oxidation and autothermal reforming, an oxygen-rich gas stream is fed into the syngas generator along with gas feed stream. Optionally, steam may also be fed into the syngas generator. In steam-methane reforming, steam is fed into the reactor along with gas feed stream. In some cases, minor amounts of other gases such as carbon dioxide, hydrogen and/or nitrogen may also be fed into the syngas generator.

Reaction and other operating conditions, and equipment and configurations, of the various reactors and technologies are in a general sense known to those of ordinary skill in the relevant art, and are not critical to the present invention in its broadest sense.

In addition to generating syngas, the reaction in the syngas generator will also generate heat energy. As indicated above, a portion of this heat energy may optionally be recovered and used, for example, to generate process steam from boiler feed water, or alternatively heat/superheat other process streams.

Multi-Train Processes

In the processes of the invention, each process may be performed in one or more processing units. For example, one or more reactors may be supplied with the feedstock from one or more feedstock preparation unit operations. Similarly, the raw product gas streams generated by one or more reactors may be processed or purified separately or via their combination in one or more gas processing units.

In certain embodiments, the processes utilize two or more reactors (e.g., 2-4 reactors). In such embodiments, the processes may contain divergent processing units (i.e., less than the total number of reactors) or convergent processing units (i.e., less than the total number of reactors) prior to the reactors for ultimately providing the feedstock and superheated gas stream to the plurality of reactors; and/or divergent or convergent processing units following the reactors for processing the raw gaseous product streams generated by the plurality of reactors.

When the systems contain convergent processing units, each of the convergent processing units can be selected to have a capacity to accept greater than a 1/n portion of the total feed stream to the convergent processing units, where n is the number of convergent processing units. Similarly, when the systems contain divergent processing units, each of the divergent processing units can be selected to have a capacity to accept greater than a 1/m portion of the total feed stream supplying the convergent processing units, where m is the number of divergent processing units.

Examples of Specific Embodiments

A specific embodiment of the process is one in which the process is a continuous process, in which steps (a), (b), (d) and (e) are operated in a continuous manner.

Another specific embodiment is one in which the liquid heavy hydrocarbon material is fed into the reactor at one or more feed points, the gaseous raw product stream is withdrawn from the reactor at one or more withdrawal points, and there is a vapor residence time from a feed point to a withdrawal point of less than about 2 seconds.

Another specific embodiment is one in which the gaseous carrier predominantly comprises, or substantially comprises, superheated steam, or a mixture of superheated steam with carbon dioxide.

In another specific embodiment, the superheated gas stream comprises carbon monoxide and hydrogen from a gas-based syngas generator, for example, one that utilizes a non-catalytic partial oxidation process or an autothermal reforming process, wherein an oxygen-rich gas stream is fed into the syngas generator along with a methane-containing feed. In one embodiment, the methane-containing feed comprises methane from the gaseous raw product stream. In another embodiment, the gaseous raw product stream is processed to remove a substantial portion of the olefin content to generate an olefin-depleted product stream, and at least a portion of the olefin-depleted product stream is fed to the syngas generator as the methane-containing feed.

Another specific embodiment is one in which an oxygen-rich gas stream is supplied periodically or continuously to the reactor, and the amount of oxygen provided is varied as a process control, for example, to assist control of the temperature in reactor. As oxygen is supplied to the reactor, carbon is partially oxidized/combusted to generate heat energy (as well as typically some amounts of carbon monoxide and hydrogen). The amount of oxygen supplied to the reactor can be increased or decreased to increase the amount of carbon being consumed and, consequently, the amount of heat energy being generated, in situ in the reactor. In such a case, this heat energy generated in situ reduces the heat demand of the reaction, and thus the amount of heat energy supplied in the superheated gas feed stream.

Another specific embodiment is one in which at least a portion of the heat energy is recovered from the gaseous raw product stream, and at least a portion of the recovered heat energy is used to generate steam for use in the process.

Another specific embodiment is one in which a bleed stream of the bed is withdrawn from the reactor, the bleed stream is hydromethanated to generate a methane-enriched synthesis gas stream and a by-product char. In one embodiment, at least a portion of the methane-enriched synthesis gas is used as a methane-containing feed for a syngas generator. In another embodiment, at least a portion of the by-product char is return to the reactor as recycle catalyst bed.

Another specific embodiment is one in which a bleed stream of the bed is withdrawn from the reactor, and the bleed stream is gasified to generate a syngas stream comprising hydrogen, carbon monoxide and heat energy. In one embodiment, the superheated gas feed stream comprises at least a portion of the syngas stream.

EXAMPLES

A 2 inch ID, 4 foot tall column was filled with a carbon char (900 g) impregnated with a potassium catalyst. The char was derived from a powder river basin (PRB) coal, and contained a K/C content of about 0.29. One run was also made with uncatalyzed activated carbon as the bed material.

A petroleum residue having the following approximate composition was utilized: C=89.3%; H=8.6%; S=1.8%; N=0.4%; V=80 ppm.

The carbon char was fluidized in the bed by flowing a superheated gas mixture of steam, hydrogen, carbon monoxide and nitrogen into the bottom of the column.

The petroleum residue was atomized by mixing with superheated steam, and fed into the column at 1300° F.

The temperature in the reactor was about 1300° F., and gas velocity was about 0.4-1.25 foot/sec, resulting in a residence time of about 1 sec for the atomized residue feed.

Each run lasted about 2 hours due to plugging of the feed injection port due to coke formation.

After each run, the captured gases were analyzed for hydrocarbon species using an infrared spectroscopy (IR) and a gas chromatography (GC). A carbon balance was also performed on the recovered gas and bed material. Typically, a carbon balance of >90% was achieved.

Example 1

A first run was made at 1300° F. and 150 psig to compare the effects of a catalyzed bed versus an uncatalyzed bed. Table 1 provides the results.

TABLE 1

| Component | Uncatalyzed Bed Yield (scf/lb residue feed) | Catalyzed Bed Yield (scf/lb residue feed) |
|---|---|---|
| $CH_4$ | 6.5 | 12.4 |
| $C_2H_4$ | Trace | 0.8 |
| $C_2H_6$ | 0.9 | 2.2 |
| $C_3H_6$ | Trace | 0.4 |
| $C_3H_8$ | Trace | 0.5 |
| $C_4+$ | Trace | 0.1 |

As can be seen from the results, the presence of the catalyst in the bed material had a significant effect on the conversion of the feedstock to lower olefins and alkanes.

Example 2

Four runs were made with the catalyzed bed at the conditions mentioned above, but at varying pressures—50 psig, 150 psig, 295 psig and 500 psig.

The results are provided in Tables 2 and 3.

TABLE 2

| Component | Fraction (mol %) 50 psig | Fraction (mol %) 150 psig | Fraction (mol %) 295 psig | Fraction (mol %) 500 psig |
|---|---|---|---|---|
| $CH_4$ | 19 | 24 | 33 | 39 |
| $C_2H_4$ | 13 | 8 | 2 | 1 |
| $C_2H_6$ | 10 | 23 | 27 | 38 |
| $C_3H_6$ | 3 | 7 | 8 | 12 |
| $C_3H_8$ | 10 | 8 | 2 | 1 |
| $C_4+$ | 1 | 3 | 2 | 3 |
| Coke (deposited on bed) | 43 | 27 | 26 | 5 |

TABLE 3

| Component | Yield (scf/lb feed) 50 psig | Yield (scf/lb feed) 150 psig | Yield (scf/lb feed) 295 psig | Yield (scf/lb feed) 500 psig |
|---|---|---|---|---|
| $CH_4$ | 5.61 | 7.06 | 9.66 | 10.55 |
| $C_2H_4$ | 1.95 | 1.23 | 0.33 | 0.20 |
| $C_2H_6$ | 1.53 | 3.31 | 3.97 | 5.14 |
| $C_3H_6$ | 0.28 | 0.68 | 0.76 | 1.06 |
| $C_3H_8$ | 0.94 | 0.76 | 0.17 | 0.10 |
| $C_4+$ | 0.10 | 0.23 | 0.15 | 0.21 |

As can be seen from the results, pressure has a significant impact on product distribution. Advantageously, higher pressures appear to lead to reduced coke formation and, consequently, higher overall desirable product yield per unit of feed (light alkanes and olefins).

We claim:

1. A process for generating a gaseous raw product stream from a liquid heavy hydrocarbon material, the process comprising the steps of:

(a) dispersing the liquid heavy hydrocarbon material in a gaseous carrier to produce a dispersed heavy hydrocarbon feed;

(b) introducing a superheated gas feed stream comprising heat energy and steam, and optionally carbon monoxide and hydrogen, into a reactor containing a bed of an alkali metal-impregnated carbonaceous carrier;

(c) optionally introducing an oxygen-rich stream into the reactor to generate heat energy and, optionally, carbon monoxide and hydrogen in situ;

(d) contacting the dispersed heavy hydrocarbon feed with steam, carbon monoxide and hydrogen in the presence of the bed of the alkali metal-impregnated carbonaceous carrier, at an elevated pressure and at a temperature of from about 1100° F. to about 1400° F., to generate a raw gaseous mixture comprising methane, one or both of ethylene and propylene, and one or both of ethane and propane; and (e) withdrawing a stream of the raw gaseous mixture from the reactor as the gaseous raw product stream, wherein the reaction in step (d) has a syngas demand, and the syngas demand is at least substantially satisfied by carbon monoxide and hydrogen that may be present in the superheated gas feed stream, and by carbon monoxide and hydrogen that may be generated in step (c).

2. The process of claim 1, wherein the liquid heavy hydrocarbon material is fed into the reactor at one or more feed points, the gaseous raw product stream is withdrawn from the reactor at one or more withdrawal points, and there is a vapor residence time from a feed point to a withdrawal point of less than about 2 seconds.

3. The process of claim 1, wherein the raw gaseous product stream comprises at least about 30 mol % methane+ethane+propane (dry basis).

4. The process of claim 1, wherein the raw gaseous product stream comprises at least about 8 mol % ethylene+propylene (dry basis).

5. The process of claim 1, wherein the liquid heavy hydrocarbon material is atomized in the gaseous carrier to produce the dispersed heavy hydrocarbon feed.

6. The process of claim 1, wherein the gaseous carrier predominantly comprises superheated steam.

7. The process of claim 1, wherein the elevated pressure is up to about 1000 psig.

8. The process of claim 1, wherein the elevated pressure is up to about 600 psig.

9. The process of claim 1, wherein an oxygen-rich gas stream is fed into the reactor.

10. The process of claim 9, wherein the amount of oxygen provided is varied as a process control to assist control of the temperature in the reactor.

11. The process of claim 1, wherein the reactor comprises a collection zone in the bottom of the reactor, and an oxygen-rich gas stream is fed into the collection zone.

12. The process of claim 1, wherein the superheated gas stream comprises carbon monoxide and hydrogen from a gas-based syngas generator.

13. The process of claim 1, wherein a gas-based syngas generator is used to generate the superheated gas stream.

14. The process of claim 12, wherein the syngas generator utilizes a non-catalytic gaseous partial oxidation process or an autothermal reforming process.

15. The process of claim 13, wherein the syngas generator utilizes a non-catalytic gaseous partial oxidation process or an autothermal reforming process.

16. The process of claim 1, wherein heat energy is recovered from the gaseous raw product stream, and at least a portion of the recovered heat energy is used to generate steam for use in the process.

17. The process of claim 1, wherein a bleed stream of the bed is withdrawn from the reactor, and the bleed stream is hydromethanated to generate a methane-enriched synthesis gas stream and a by-product char.

18. The process of claim 17, wherein at least a portion of the by-product char is returned to the reactor as recycle catalyst bed.

19. The process of claim 1, wherein a bleed stream of the bed is withdrawn from the reactor, and the bleed stream is gasified to generate a syngas stream comprising hydrogen, carbon monoxide and heat energy.

20. The process of claim 1, wherein the liquid heavy hydrocarbon material comprises a material selected form the group consisting of vacuum resids; atmospheric resids; heavy and reduced petroleum crude oils; pitch, asphalt and bitumen; tar sand oil; shale oil; bottoms from catalytic cracking processes; and coal liquefaction bottoms.

\* \* \* \* \*